(12) United States Patent
Sarkar et al.

(10) Patent No.: US 12,008,873 B2
(45) Date of Patent: Jun. 11, 2024

(54) SCALABLE EVENT-DRIVEN SOFTWARE ARCHITECTURE FOR THE AUTOMATION OF PEOPLE-CENTRIC SYSTEMS

(71) Applicant: Purdue Research Foundation, West Lafayette, IN (US)

(72) Inventors: Rohan Sarkar, West Lafayette, IN (US); Avinash Kak, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 960 days.

(21) Appl. No.: 16/436,164

(22) Filed: Jun. 10, 2019

(65) Prior Publication Data
US 2020/0388121 A1 Dec. 10, 2020

(51) Int. Cl.
*G08B 13/14* (2006.01)
*G06F 9/54* (2006.01)
(Continued)

(52) U.S. Cl.
CPC .............. *G08B 13/14* (2013.01); *G06F 9/546* (2013.01); *G06Q 10/087* (2013.01); *G06Q 50/265* (2013.01)

(58) Field of Classification Search
CPC ...... G08B 13/14; G06F 9/546; G06Q 10/087; G06Q 50/265
See application file for complete search history.

(56) References Cited

U.S. PATENT DOCUMENTS 6,092,197 A * 7/2000 Coueignoux .......... G06Q 30/02
709/201
9,158,601 B2 * 10/2015 Zhang ..................... G06F 9/542
(Continued)

FOREIGN PATENT DOCUMENTS

CN 109414119 A * 3/2019 ......... G06K 9/00771

OTHER PUBLICATIONS

Sarkar; Checksoft : A Scalable Event-Driven Software Architecture for Keeping Track of People and Things in People-Centric Spaces; Feb. 23, 2021; 33 pages (Year: 2021).*
(Continued)

*Primary Examiner* — Kevin L Young
*Assistant Examiner* — Kimberly L Jordan
(74) *Attorney, Agent, or Firm* — Maginot, Moore & Beck LLP

(57) ABSTRACT

A method, processing system, and tracking system for monitoring person-object interactions in an environment is disclosed. In particular, software architecture is provided for processing tracking and event information provided by independent trackers to identify basic interactions between the people in the environment and objects or storage entities in the environment. Based on the identified person-object interactions, the software architecture can associate individual persons with object and storage entities, detect and infer outcomes of their basic interactions, infer higher-level interactions, and detect any anomalous interactions. The software architecture is advantageously highly modular, scalable, and decentralized, and is designed to be substantially domain agnostic, such that it can be used to automate a wide variety of human-centric applications that involve humans interacting with objects.

18 Claims, 13 Drawing Sheets

(51) Int. Cl.
   *G06Q 10/087*  (2023.01)
   *G06Q 50/26*   (2012.01)

(56) References Cited

U.S. PATENT DOCUMENTS

| | | | |
|---|---|---|---|
| 10,535,146 B1* | 1/2020 | Buibas | G06T 17/00 |
| 2015/0199890 A1* | 7/2015 | Hewett | G08B 13/2428 340/572.1 |
| 2017/0323376 A1* | 11/2017 | Glaser | G06Q 30/0643 |
| 2020/0193166 A1* | 6/2020 | Russo | G06V 10/50 |
| 2020/0265494 A1* | 8/2020 | Glaser | G06Q 10/087 |

OTHER PUBLICATIONS

Ning, J. Q., Component-based software engineering (cbse), in Proceedings Fifth International Symposium on Assessment of Software Tools and Technologies, Jun. 1997, pp. 34-43.

Parnas, D. L., On the criteria to be used in decomposing systems into modules, Commun. ACM, Dec. 1972, pp. 1053-1058, vol. 15, No. 12, http://doi.acm.org/10.1145/361598.361623.

Hinze, A. et al., Event-based applications and enabling technologies, in Proceedings of the Third ACM International Conference on Distributed Event-Based Systems, 2009, pp. 1:1-1:15, ACM, New York NY, http://doi.acm.org/10.1145/1619258.1619260.

Etzion, O., Towards an event-driven architecture: An infrastructure for event processing position paper, in Rules and Rule Markup Languages for the Semantic Web, A. Adi, S. Stoutenburg, and S. Tabet, Eds. Berlin, Heidelberg, 2005, pp. 1-7, Springer Berlin Heidelberg.

Chandy, M. K., Event-driven applications: Costs, benefits and design approaches, 2006.

Michelson, B. M., Event-driven architecture overview: Event driven soa is just part of the eda story, Jan. 2006.

Laliwala, Z. et al., Event-driven service-oriented architecture, International Conference on Service Systems and Service Management, Jun. 2008, pp. 1-6.

Clark, T. et al., Event driven architecture modelling and simulation, Proceedings of 2011 IEEE 6th International Symposium on Service Oriented System (SOSE), Dec. 2011, pp. 43-54.

Kak, A. C., Why OO Programming Some Parallels with Things at Large, 2003, pp. 1144, Wiley—IEEE Press, http://ieeexplore.ieee.org/xp/articleDetails.jsp?arnumber=5271081.

Oreizy, P., A flexible approach to decentralized software evolution, in Proceedings of the 21st International Conference on Software Engineering, ICSE 1999, pp. 730-731, ACM, New York, NY, http://doi.acm.org/10.1145/302405.303000.

Ahmad, I. et al., Special issue on video surveillance, IEEE Transactions on Circuits and Systems for Video Technology, Aug. 2008, pp. 1001-1005, vol. 18, No. 8, IEEE.

Collins, R. T. et al., Introduction to the special section on video surveillance, IEEE Transactions on Pattern Analysis and Machine Intelligence, Aug. 2000, pp. 745-746, vol. 22, No. 8, IEEE.

Nguyen, D. T. et al., Human detection from images and videos: A survey, Sep. 2015, vol. 51.

Zhao, T. et al., Tracking multiple humans in crowded environment, Proceedings of the 2004 IEEE Computer Society Conference on Computer Vision and Pattern Recognition, Jun. 2004, pp. II-406-II-413, vol. 2.

Fan, L. et al., A survey on multiple object tracking algorithm, 2016 IEEE International Conference on Information and Automation (ICIA), Aug. 2016, pp. 1855-1862.

Alper Yilmaz, O. J. et al., Object tracking: A survey, ACM Computing Surveys (CSUR), Dec. 2006, pp. 31-39, vol. 38, No. 13.

Liu, H. et al., Intelligent video systems and analytics: A survey, IEEE Transactions on Industrial Informatics, Aug. 2013, pp. 1222-1233, vol. 9, No. 3.

Bhargava, M. et al., Detection of abandoned objects in crowded environments, 2007 IEEE Conference on Advanced Video and Signal Based Surveillance, Sep. 2007, pp. 271-276.

Wu, Z. et al., Real-time airport security checkpoint surveillance using a camera network, CVPR 2011 Workshops, Jun. 2011, pp. 25-32.

Xu, L.-Q., Issues in video analytics and surveillance systems: Research / prototyping vs. applications / user requirements, 2007 IEEE Conference on Advanced Video and Signal Based Surveillance, Sep. 2007, pp. 10-14.

Oreizy, P., Decentralized software evolution, Proceedings of the International Conference on the Principles of Software Evolution (IWPSE), 1998.

Sarkar, S. et al., Metrics for measuring the quality of modularization of large-scale object-oriented software, IEEE Transactions on Software Engineering, Sep. 2008, pp. 700-720, vol. 34, No. 5, IEEE.

Java remote method invocation—distributed computing for java, available as of Jun. 2019. http://www.oracle.com/technetwork/java/javase/tech/indexjsp-138781.html.

* cited by examiner

| Inference State Machine ||||| Anomaly Detector |||
|---|---|---|---|---|---|---|---|---|
| Elementary Actions ||| Higher Level Interaction | Task | Set/Test Ownership | HumEnt $H_X$ owns || Task |
| Past | Present | Future | | | | OBlob $O_J$ | Storage $S_Y$ | |
| $\phi$ | A | DNC | Divest own object | | Set | Yes | Yes | Append $O_J$ in $H_X.D^{Ownership}$ |
| DNC | A | $\phi$ | Left own object in own Bin | | Test | Yes | Yes | Warn $H_X$ |
| | | | Left own object in other's Bin | | | Yes | No | Raise Alarm |
| $\phi$ | R | DNC | Taking other's object | Alarm | Test | No | No | |
| A | R | $\phi$ | Collect own object from own Bin | | Test | Yes | Yes | |
| | | | Collect other's object from other's Bin | | | No | No | Raise Alarm |
| R | A | DNC | Move own object to own Bin | | Test | Yes | Yes | |
| | | | Move own object to other's Bin | | | Yes | No | Raise Alarm |
| | | | Move other's object to own Bin | | | No | Yes | Raise Alarm |
| | | | Move other's object to other's Bin | | | No | No | Raise Alarm |
| DNC | R | A | Move own object from own Bin | | Test | Yes | Yes | |
| | | | Move own object from other's Bin | | | Yes | No | Warning |
| | | | Move other's object from own Bin | | | No | Yes | Raise Alarm |
| | | | Move other's object from other's Bin | | | No | No | Raise Alarm |

| Inference State Machine | | | | | | Anomaly Detector | |
|---|---|---|---|---|---|---|---|
| Elementary Actions | | | Higher Level Interaction | Task | Set/Test Ownership | StoEnt$S_Y$ owns OBlob $O_J$ | Task |
| Past | Present | Future | | | | | |
| DNC | R | DNC | Picked up | Buy++; Inspect++; | Test | Yes | |
| | | | Picked up misplaced item | | | No | Call for assistance to verify product |
| DNC | A | DNC | Returned to correct shelf | Buy--; | Test | Yes | Return++; |
| | | | Misplaced item in wrong shelf | | | No | Misplace++; Notify CustEnt and StaffEnt |
| DNC | A or R | φ | CustEnt finishes interaction with this product | Add amount to bill for current product Amount+=[Buy*price] | | | |

FIG. 15

SCALABLE EVENT-DRIVEN SOFTWARE ARCHITECTURE FOR THE AUTOMATION OF PEOPLE-CENTRIC SYSTEMS

FIELD

The device and method disclosed in this document relates to automation of people-centric systems and, more particularly, to monitoring person-object interactions on a continuing basis in an environment.

BACKGROUND

Unless otherwise indicated herein, the materials described in this section are not prior art to the claims in this application and are not admitted to the prior art by inclusion in this section.

This disclosure concerns the automation of people-centric systems in which a person walks into an environment and interacts with objects in the environment without any overt interaction with either a machine or designated human officials. Examples of such people-centric systems that might be automated in this manner include retail stores, building security checkpoints, airport security checkpoints, libraries and warehouse systems. Additional more specialized applications of this disclosure include museums where ordinarily people are not allowed to touch objects, and, therefore it becomes important to detect such person-object contacts and self-service cafeterias where people are allowed to serve themselves food items that may be stored in large containers. Major challenges in automating such people-centric systems include detecting interactions between people and objects, determining outcomes of such interactions, and detecting anomalous interactions, particularly those that require some remedial action be taken. Accordingly, what is needed is a system and software architecture that enables robust monitoring of these person-object interactions and enables quick and reliable detection of anomalies. It would be advantageous if such a system and software architecture was designed in a modular, scalable, and decentralized manner such that it is easily adapted to a wide variety of different applications and domains.

SUMMARY

A method for tracking person-object interactions in an environment is disclosed. The method comprises receiving, with at least one processor, (i) event data with respect to a plurality of person entities and a plurality of storage entities in the environment and (ii) storage content data with respect to the storage entities, the event data identifying times at which particular person entities in the plurality of person entities moved an extremity into particular storage entities in the plurality of storage entities, the event data identifying times at which particular person entities in the plurality of person entities removed an extremity from particular storage entities in the plurality of storage entities, the storage content data including a plurality of lists identifying object entities in a plurality of object entities that are located within particular storage entities in the plurality of storage entities at different times; and determining, with the at least one processor, based on the event data and the storage content data, at least one of (i) at least one first object entity that was added to a first storage entity in the plurality of storage entities and (ii) at least one second object entity that was removed from the first storage entity, as a result of an interaction in which a first person entity in the plurality of person entities moved an extremity into the first storage entity and subsequently removed an extremity from the first storage entity.

A processing system for tracking person-object interactions in an environment is disclosed. The processing system comprises at least one memory and at least one processor. The at least one memory is configured to store (i) program instructions, (ii) event data with respect to a plurality of person entities and a plurality of storage entities in the environment, and (iii) storage content data with respect to the storage entities, the event data identifying times at which particular person entities in the plurality of person entities moved an extremity into particular storage entities in the plurality of storage entities, the event data identifying times at which particular person entities in the plurality of person entities removed an extremity from particular storage entities in the plurality of storage entities, the storage content data including a plurality of lists identifying object entities in a plurality of object entities that are located within particular storage entities in the plurality of storage entities at different times. The at least one processor is configured execute the program instructions to: receive, and store in the memory, the event data and the storage content data; and determine, based on the event data and the storage content data, at least one of (i) at least one first object entity that was added to a first storage entity in the plurality of storage entities and (ii) at least one second object entity that was removed from the first storage entity, as a result of an interaction in which a first person entity in the plurality of person entities moved an extremity into the first storage entity and subsequently removed an extremity from the first storage entity.

A system for tracking person-object interactions in an environment is disclosed. The system includes at least one tracker device and a processing system. The a least one tracker device is configured to determine (i) event data with respect to a plurality of person entities and a plurality of storage entities in the environment and (ii) storage content data with respect to the storage entities, by monitoring the environment with at least one sensor, the event data identifying times at which particular person entities in the plurality of person entities moved an extremity into particular storage entities in the plurality of storage entities, the event data identifying times at which particular person entities in the plurality of person entities removed an extremity from particular storage entities in the plurality of storage entities, the storage content data including a plurality of lists identifying object entities in a plurality of object entities that are located within particular storage entities in the plurality of storage entities at different times. The processing system has at least one memory configured to store (i) program instructions, (ii) the event data, and (iii) the storage content data; and at least one processor configured execute the program instructions to: receive, and store in the memory, the event data and the storage content data; and determine, based on the event data and the storage content data, at least one of (i) at least one first object entity that was added to a first storage entity in the plurality of storage entities and (ii) at least one second object entity that was removed from the first storage entity, as a result of an interaction in which a first person entity in the plurality of person entities moved an extremity into the first storage entity and subsequently removed an extremity from the first storage entity.

BRIEF DESCRIPTION OF THE DRAWINGS

The foregoing aspects and other features of the method, processing system, and system are explained in the following description, taken in connection with the accompanying drawings.

FIG. 14 shows a table summarizing inference logic for detecting higher-level interactions and anomalous interactions for the exemplary application of FIG. 2.

FIG. 15 shows a table summarizing inference logic for detecting higher-level interactions and anomalous interactions for the exemplary application of FIG. 3.

DETAILED DESCRIPTION

Figure 1:
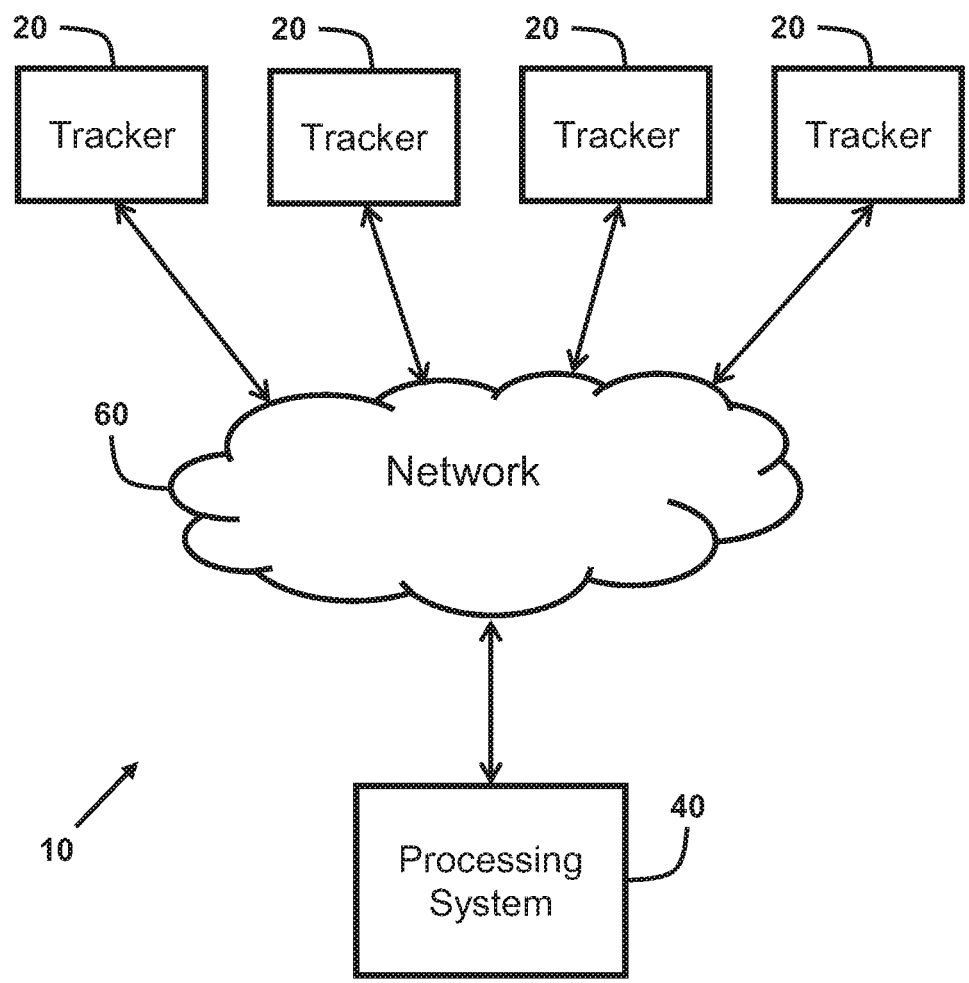
FIG. 1 shows an exemplary embodiment of a person-object interaction tracking system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

With reference to FIGS. 1-4, exemplary embodiments of the system 10 are shown. The system 10 is configured to continuously monitor and record interactions between people and objects in an environment. Based on the recorded person-object interactions, the system 10 is configured to make necessary inferences as required by the particular system to provide automation of the system. Such inferences may include establishing associative relationships between people and objects (e.g., inferring that an object belongs to a person or that a person intends on purchasing an object) or determining outcomes of particular person-object interactions (e.g., that an object has been moved from one location to another).

Based on the recorded person-object interactions, inferences, and associations, the system 10 can detect any anomalies that might require intervention and generate warnings or initiate remedial actions. For example, in an airport security checkpoint, a warning can be generated if a person accidently (or intentionally) takes an object that belongs to another person or leaves behind an item in the security area. In addition to automation, the recorded person-object interactions, inferences, and associations can be used by businesses to optimize their operations by measuring the level of customer interest in the objects. For example, in a retail store, optimizations can be carried out with regard to how the objects (i.e., merchandise for sale) are presented to people in the retail store (i.e., customers) and for more efficient inventory management.

The system 10 and software architecture thereof are advantageously highly modular, scalable, and decentralized. Particularly, many of the various components and modules operate as finite-state-machines which trigger actions in response to the different states of the humans and the objects. Thus, the system 10 and software architecture thereof is event-driven, in the sense that each event monitored or interaction detected in the environment elicits an appropriate action from one of the components or modules. The various components and modules may also collaborate in response to some of the events.

Additionally, the system 10 and software architecture thereof are advantageously designed to be substantially domain agnostic, meaning that it can be used to automate a wide variety of human-centric applications that involve humans interacting with objects. The particular inferences made by the system 10 and corresponding inference logic used will generally vary depending on the application. Likewise, the anomalies that are detected and the actions taken in response to the anomalies also vary depending on the application. Nevertheless, generalization to different applications can be obtained with only minor tweaks to the system logic, without any changes to the overall architectural framework.

In the description of the system 10 and the software architecture thereof, exemplary applications of the system 10 to an airport security checkpoint and to a smart retail store will be described in greater detail for illustrative purposes. In the airport security checkpoint context, the system 10 is applied for the purpose of managing the flow of passengers through an airport security checkpoint and keeping track of their belongings as they move through the security checkpoint. In the smart retail store context, the system 10 is applied for the purpose of keeping track of merchandise that has been taken from the smart retail store by customers for purchase. However, it will be appreciated that the system 10 can be easily applied to many other domains. For example, further domains that might utilize that the system 10 include libraries, building security checkpoints, warehouse systems, and inventory management systems. Additional more specialized applications of this disclosure include museums where ordinarily people are not allowed to touch objects, and, therefore it becomes important to detect such person-object contacts and self-service cafeterias where people are allowed to serve themselves food items that may be stored in large containers.

As shown in FIG. 1, the system 10 at least includes trackers 20 and a processing system 40, which are in communication with one another via a network 60. The trackers 20 are configured to track and record positions of a plurality of entities in an environment. In particular, the trackers 20 are configured to track and record positions of at least three different classes of entities: people, objects, and storage entities. As used herein, "entity" or "entities" refers to any physical bodies or physical location within a real-world environment that is being monitored.

In the embodiments described in detail herein, the software architecture of the system 10 defines a root class Entity, which may be for example a Java class, for tracking information with respect to individual entities in the monitored environment. The root class Entity has at least three primary subclasses HumEnt, OBlob, and StoEnt, the attributes of which will be described in greater detail elsewhere herein. These entities classes, and subclasses derived therefrom, serve as the principal data structures for the software architecture of the system 10.

The HumEnt subclass serves as a base class for different types of human persons or groups of associated human persons that have entered the monitored environment. The OBlob subclass corresponds to a distinct object in the monitored environment or a cluster of objects in the monitored environment if distinct items cannot be distinguished by the trackers 20. Thus, as used herein an "object" refers to a physical object or cluster of physical objects in a real-world environment that is being monitored. Accordingly, it must be appreciated that an instance of OBlob represents what the system 10 "thinks" is an object. It is possible for such an instance to implicitly represent a collection of objects that are not visible separately. Moreover, it is possible that through human interaction a human would pull off a part of what is currently believed to be a single object, with the part itself being an object unto itself, and with the rest also being considered to be an object. In other words, a single instance of OBlob could spawn multiple OBlob instances. Finally, the StoEnt subclass serves as a base class for different types of storage entities that are utilized in the monitored environment. As used herein, "storage entity" refers broadly to any container, receptacle, or similar apparatus, as well as merely a physical location, in a real-world environment that is being monitored, which acts as a storage location or resting place for an object in the environment. Exemplary storage entities may comprise a shopping cart, a location on a shelf, a table, a security checkpoint bin, or a location on a conveyor or similar system for a security checkpoint.

In the embodiments described herein, an integer ID is assigned to each instance of the entities described above. For example the $i^{th}$ HumEnt instance will be denoted as $HumEnt_1$ or simply $H_i$, the $k^{th}$ StoEnt instance will be denoted as $StoEnt_{k\ or\ simply\ Sk}$, and the $j^{th}$ OBlob instance will be denoted as $OBlob_j$ or simply $O_j$. In some embodiments, each of the entity instances is instantiated with position coordinates or a list of position coordinates. In some embodiments, the entity instances are instantiated with additional data including shape or size parameters, color/texture characterizations, or any other relevant data for identifying and tracking the corresponding entities.

Figure 2:
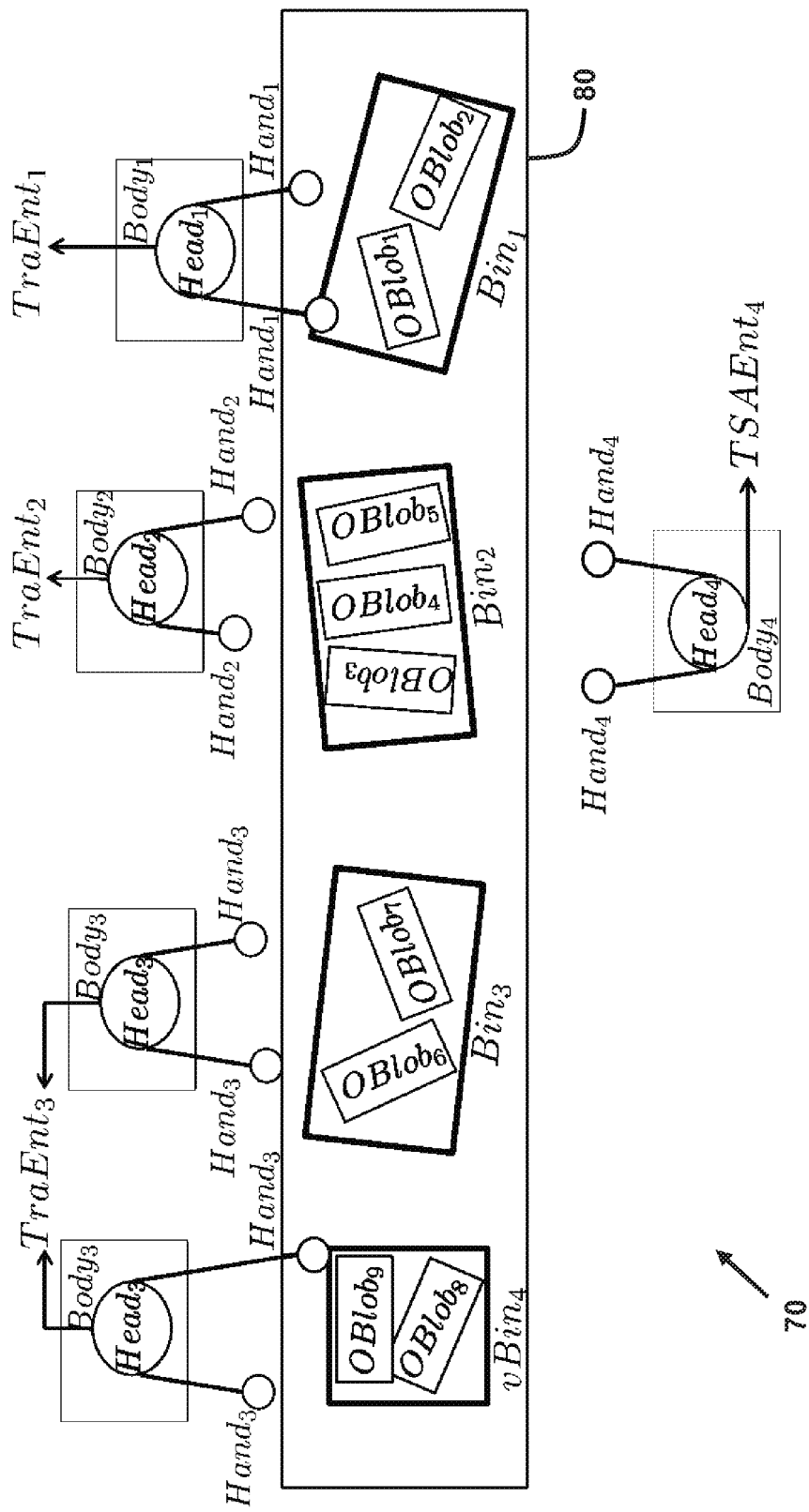
FIG. 2 illustrates principal data structures for one exemplary application of the person-object interaction tracking system of FIG. 1 as employed for airport checkpoint security.

FIG. 2 illustrates principal data structures for one exemplary application of the system 10. Particularly, FIG. 2 shows an airport security checkpoint environment 70 having a conveyor 80. In the airport security checkpoint environment 70, passengers place their belongings either directly onto the conveyor 80 or in a security checkpoint bin that is placed onto the conveyor 80. A security official, such as an agent of the Transportation Security Administration (TSA), observes the passengers and their belongings as the passengers flow through the security checkpoint.

In this exemplary application, the entities of interest that are monitored by the trackers 20 of the system 10 are the passengers, the security officials, the passengers' belongings, the security checkpoint bins, and the locations at which passengers placed their belongings directly onto the conveyor 80. These entities of interest are represented herein by the principal state variables and/or entities TraEnt, TSAEnt, OBlob, Bin, and vBin, respectively.

The entities TraEnt and TSAEnt are each subclasses of the HumEnt class. A HumEnt corresponds to any person or group of associated persons that have entered the monitored environment. The subclasses TraEnt and TSAEnt distinguish between passengers and security officials/TSA agents. A TraEnt is a passenger traveling alone or a group of passengers traveling together. Particularly, in some cases, a group of associated persons, such as passengers traveling together or listed in the same flight record, may be represented as a single instance of TraEnt. In contrast, a TSAEnt, is a single agent or a group of agents performing security checks in the security checkpoint environment 70.

In the embodiment shown, the HumEnt subclass has a data attribute PhysicalState that includes additional variables Head, Body, and Hand to record the physical state of human entities. The variable Head represents the head of an individual person. Likewise, the variable Hand represents a hand of an individual person. However, the variable Body represents an overall color/texture characterization of the clothing worn by the human, if it is a single passenger, or by a set of such color/texture characterizations for a group of passengers traveling together. In some embodiments, an instance of HumEnt is only instantiated when at least a Head element can be instantiated with the coordinates of the head of the passenger by one of the trackers 20 and one or both Hand elements can be later instantiated with the coordinates of each hand of the passenger by one of the trackers 20. For cases in which a HumEnt instance represents a group of people, the Head and Hand variables may correspond to a list of the coordinates associated with the heads of all the human entities and their hands.

The entities Bin and vBin are each subclasses of the StoEnt class. Particularly, a Bin is an individual security checkpoint bin into which a passenger has divested his/her belongings. Similarly, a vBin is virtual security checkpoint bin or, in other words, simply an area of the conveyor 80 covered by the objects divested by a passenger. In one embodiment, an instance of vBin is assumed to represent the smallest bounding rectangle for the portion of the conveyor 80 occupied by the objects divested there by the passenger.

Finally, the entities OBlob correspond to the passengers' belongings (i.e., objects). Particularly, an OBlob is an object or cluster of objects that has been divested by any TraEnt instance. Each OBlob instance represents a distinct object if it can be distinguished from the rest. Should a given TraEnt instance dump all at once all of his/her/their belongings in one single heap in a security checkpoint bin or directly on the conveyor 80, then the Bin/vBin instance created by that TraEnt will have associated with it a single instance of OBlob. On the other hand, should the process of divesting the items be sequentially discernible, the system 10 can associate multiple instances of OBlob with that Bin/vBin. In one embodiment, several subclasses of OBlob may be defined (not shown), such as AllowItem representing allowed items in the airport security checkpoint, ProhibitItem representing prohibited items in the airport security checkpoint, and DangerItem representing dangerous items in the airport security checkpoint. These subclasses are just examples. It would be easy to think of similar such subclasses for the airport security checkpoint application.

Figure 3:
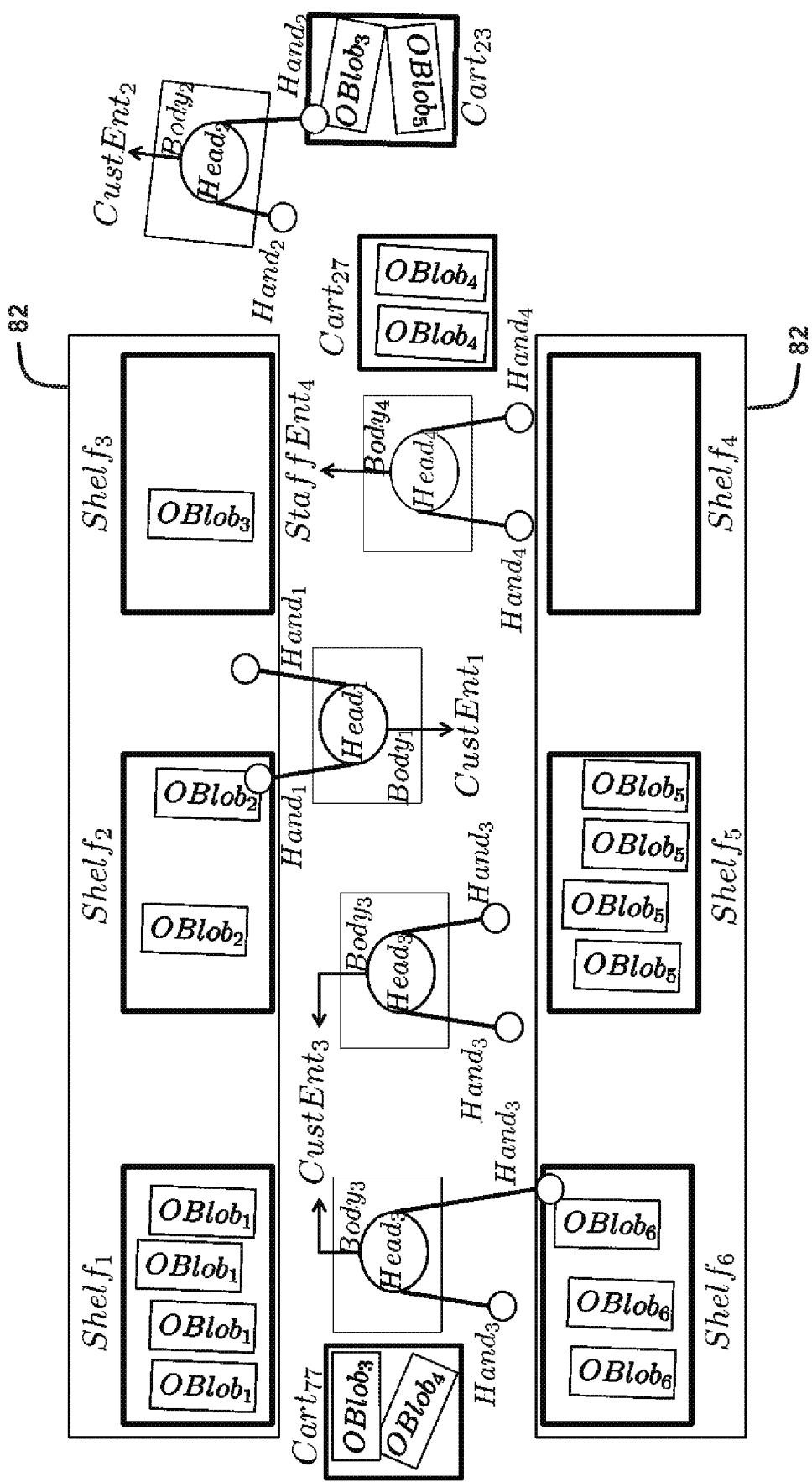
FIG. 3 illustrates principal data structures for another exemplary application of the person-object interaction tracking system of FIG. 1 as employed for automated retail-store operations.

FIG. 3 illustrates principal data structures for another exemplary application of the system 10. Particularly, FIG. 3 shows an automated retail store environment 72 having shelving units 82, upon which merchandise is stored for purchase by customers. In the automated retail store environment 72, customers remove merchandise from the shelving units 82 and may exit simply the automated retail store environment 72 to purchase the merchandise. Additionally, retail staff may restock the shelving units 82 with merchandise.

In this exemplary application, the entities of interest that are monitored by the trackers 20 of the system 10 are the customers, the retail staff, the merchandise, locations on the shelving units 82 at which merchandise is stored, and carts used by customers or retail staff for temporary storage of merchandise. These entities of interest are represented herein by the principal state variables CustEnt, Staff Ent, OBlob, Shelf, and Cart, respectively.

The entities CustEnt and StaffEnt are each subclasses of the HumEnt class. The subclasses CustEnt and Staff Ent distinguish between customers and retail staff. A CustEnt is a customer shopping alone or a group of customers shopping together. Particularly, in some cases, a group of associated persons, such as a family shopping together, may be represented as a single instance of CustEnt. In some embodiments, it is likely that when a family enters the store, only one individual in the family would swipe his/her smart phone so that system would know whom to charge the purchases to. In this case, while any member of the family might interact with the objects (such as picking up an object and placing it in the shopping cart), the whole family would be kept track of as a single instance of CustEnt. In contrast, a Staff Ent, is generally a single retail employee or a group of retail employees performing his/her/their duties in the automated retail store environment 72. As in the embodiment of FIG. 2, the HumEnt subclass includes additional variables Head, Body, and Hand, which are not described again in detail.

The entities Shelf and Cart are each subclasses of the StoEnt class. Particularly, a Shelf is an individual location on a shelving unit 82 at which merchandises is stored for display and purchase. In contrast, a Cart is a mobile shopping cart or similar mobile storage entity for merchandise. In at least one embodiment, the system 10 distinguishes between instances of a Cart associated with a CustEnt that are used for shopping for merchandise (e.g., the $Cart_{23}$ or $Cart_{77}$) and instances of a Cart associated with a StaffEnt that are used for restocking merchandise (e.g., the $Cart_{27}$).

Finally, the entities OBlob corresponds to merchandise (i.e., objects). Particularly, an OBlob is an item of merchandise that is on display and available for purchase by a CustEnt in the automated retail store environment 72. Each OBlob instance represents a type of merchandise. Particularly, unlike the embodiment of FIG. 2, each item of merchandise is not distinct. Instead, repeated items of the same type share the same ID. Each OBlob instance can be associated with particular Shelf instance or Cart instance. Additionally, when a CustEnt picks up an OBlob instance, it may be associated with the CustEnt at least temporarily. In one embodiment, several subclasses of OBlob may be defined (not shown), such as FoodItem representing edible products in the automated retail store checkpoint, ElectronicItem representing electronic goods in the automated retail store, and DailyItem representing products for daily use in the automated retail store. These subclasses are just examples. It would be easy to think of similar such subclasses for the automated retail store application.

Returning to FIG. 1, the trackers 20 are further configured to detect and record several basic events which occur in the monitored environment. In particular, for an ordinary application of the disclosed system the trackers 20 are configured to detect and record the following types of events: (1) human entities entering or exiting the monitored environment, (2) human entities instantiating new storage entities or returning used storage entities, (3) object blobs being placed in any of the storage entities or being taken out of any of the storage entities, and (4) hands of human entities reaching inside or coming out of the storage entities. These events may be augmented or replaced for more specialized applications of this disclosure.

In the embodiments described in detail herein, the software architecture of the system 10 defines a root class Event, which may be for example a Java class, for recording events that are detected in the monitored environment. The root class Event has a plurality of subclasses for different types of events that may be detected in the monitored environment. In at least one embodiment, the Event class has subclasses HumanEnter and HumanExit, which correspond to a HumEnt entering or exiting the monitor environment. In at least one embodiment, the Event class has subclasses HandIn and HandOut, which correspond to a HumEnt reaching into and out of a StoEnt. In at least one embodiment, the Event class has subclasses StorageInstantiate and StorageReturn, which correspond to a HumEnt instantiating/claiming a new StoEnt or returning a StoEnt, such as a Cart or Bin/vBin. Finally, in at least one embodiment, the Event class has as subclass Storage Update, which corresponds to at least one OBlob being placed into a StoEnt or being removed from a StoEnt. It will be appreciated, however, that the particular events that are detected and recorded will vary depending on the application. Additional events can be added as and when required by deriving subclasses from the root class Event.

Throughout the disclosure, the HandIn and HandOut events are described with respect to a hand reaching into and out of a StoEnt. However, it should be appreciated that HandIn and HandOut events can correspond to any analogous event in which a HumEnt reaches into and out of a StoEnt with any other extremity, such as a foot or some tool that is manipulated by the HumEnt to reach into or out of a StoEnt. Accordingly, any reference herein to a "hand" should be understood to include any extremity. As used herein, "extremity" refers to any bodily extremity, such as a hand, foot, elbow, arm, leg, or head of a human body, as well as to any tool that is manipulated by a human to interact with a storage entity, such as a grasping tool, robotic arm, or the like.

We note that the particular sensors, methods, or techniques used by the trackers 20 to track and record the relevant entities in the monitored environment and to detect and record the relevant events in the monitored environment are beyond the scope of this disclosure and any technique can be utilized. Thus, it is assumed that the trackers 20 that are being used to monitor the space have continuously running processes that can accurately track the individuals (and, when such is needed, groups of individuals) and identify the object blobs whether or not they are inside storage entities. Similarly, it is assumed that the trackers 20 that are being used to monitor the space have continuously running processes that can accurately detect the particular events discussed above, or can at least provide tracking information from which the events are easily derived.

Thus, it will be appreciated that the processing system 40 is agnostic with respect to the particular sensors, methods, or techniques, used by the trackers 20. In this way, a variety of different types of trackers 20 can be utilized in conjunction with the processing system 40 on a plug-n-play basis. The software utilized by the trackers 20 to track the positions of people, objects, and storage entities in the environment and to detect the basic events in the environment can be run asynchronously with respect to that of other trackers 20 and with respect to the processing system 40.

With continued reference to FIG. 1, the processing system 40 is in communication with an arbitrary number of trackers 20 via the network 60 and is configured to receive tracking and event information from the trackers 20. As discussed in greater detail below, the processing system 40 is configured to processing the tracking and event information provided by the trackers 20 to identify basic interactions between the people in the environment (e.g., instances of HumEnt) and objects or storage entities in the environment (e.g., instances of OBlob or StoEnt). Based on the identified person-object interactions, the processing system 40 can associate individual persons with object and storage instances, detect and infer outcomes of their basic interactions, infer higher-level interactions, and detect any anomalous interactions (such as a passenger reaching into a bin that is not associated with him/her or customers misplacing items in a retail store). All of these associative relationships, detected basic interactions, inferred higher-level interactions, and inferred anomalous interactions are recorded on a continuous basis for post-facto analysis.

Figure 4:
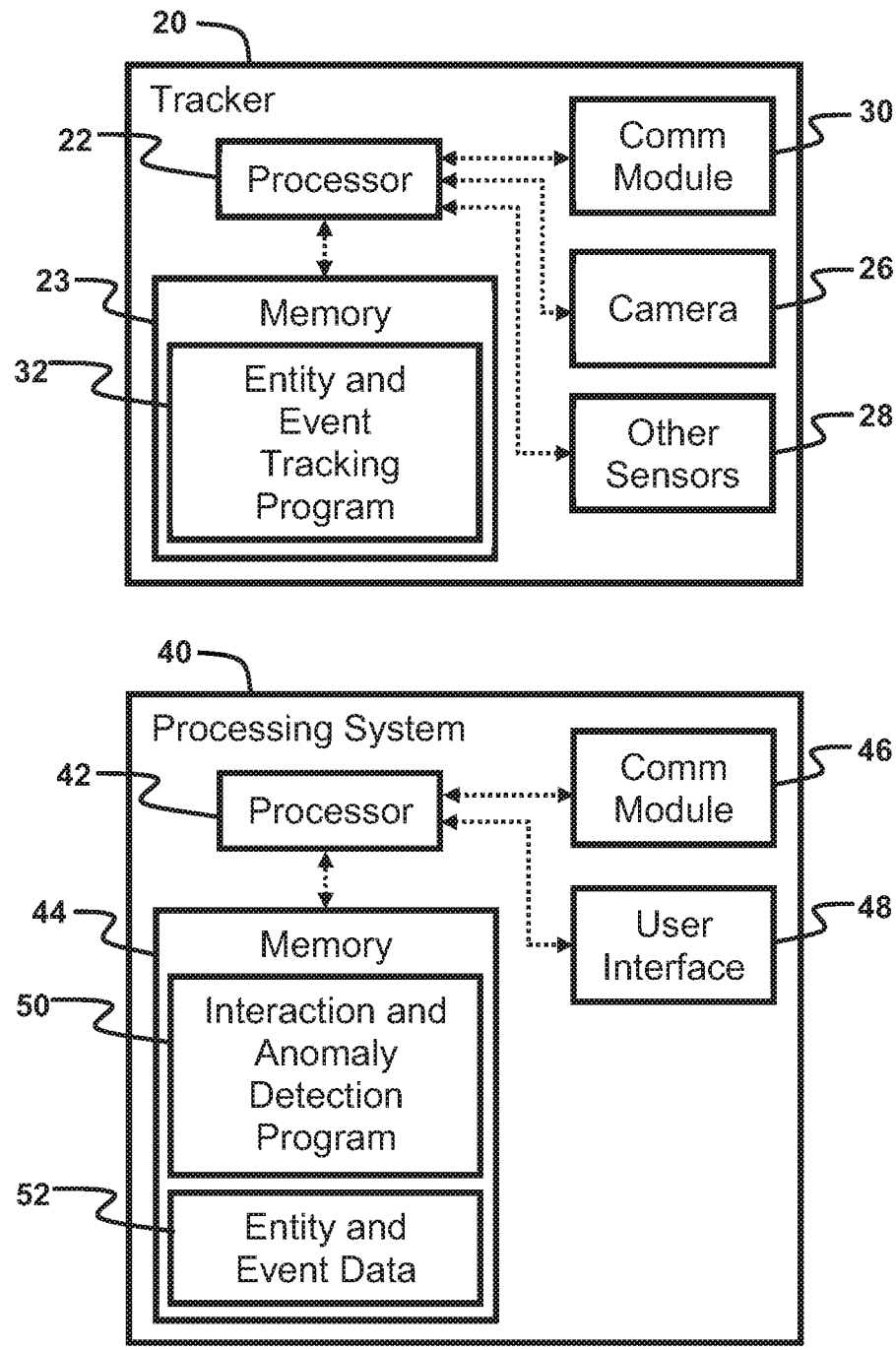
FIG. 4 shows exemplary components of the trackers and the processing system of FIG. 1.

FIG. 4 shows exemplary components of the trackers 20 and the processing system 40 of the system 10. It will be appreciated that the components of the trackers 20 and the processing system 40 shown and described are merely exemplary and that the trackers 20 and the processing system 40 may comprise any alternative configuration. Moreover, in the illustration of FIG. 2, only a single tracker 20 and a single processing system 40 are shown. However, in practice the system 10 may include any number of trackers 20 and any number of processing systems 40 that operate in concert with one another.

In the illustrated exemplary embodiment, each tracker 20 comprises a processor 22, memory 24, tracking sensors 26 and 28, and a communication module 30. The memory 24 is configured to store data and program instructions that, when executed by the processor 22, enable the tracker 20 to perform various operations described herein. The memory 24 may be of any type of device capable of storing information accessible by the processor 22, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 22 may include a central processing unit, graphics processing units, multiple processing units, dedicated circuitry for achieving functionality, programmable logic, or other processing systems.

In at least one embodiment, the trackers 20 are video-based trackers that track people, objects, and storage entities in the monitored environment using a video camera 26. However, the particular techniques used for video-based tracking of people, objects, and storage entities in the monitored environment are beyond the scope of this disclosure and any technique can be utilized. Additionally, the trackers 20 may include additional different or supplemental sensors 28, such as weight sensors, RFID sensors, etc., as required for different applications.

The communication module 30 comprises one or more transceivers, modems, or other communication devices configured to enable communications with various other devices, at least including the processing system 40 and, in particular, via the network 60 using a suitable communication standard. The communication module 30 may further comprise hardware such as antennas, processors, memories, oscillators, or other hardware conventionally included with transceivers, modems, or other communication devices.

In at least one embodiment, the program instructions stored on the memory 24 include an entity and event tracking program 32. The processor 22 is configured to execute the entity and event tracking program 32 to track the relevant entities and to detect the relevant events in the monitored environment. Additionally, the processor 22 is configured to execute the entity and event tracking program 32 to interface with the processing system 40 to record and/or transmit the tracking and event information to the processing system 40, for the purpose of further analysis and usage thereat.

With continued reference to FIG. 4, in the illustrated exemplary embodiment, the processing system 40 comprises at least one processor 42, at least one memory 44, a communication module 46, and a user interface 48. The memory 44 is configured to store data and program instructions that, when executed by the at least one processor 42, enable the processing system 40 to perform various operations described herein. The memory 44 may be of any type of device capable of storing information accessible by the at least one processor 42, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The at least one processor 42 may include a central processing unit, graphics processing units, multiple processing units, dedicated circuitry for achieving functionality, programmable logic, or other processing systems. As discussed above, it will be appreciated that, although the processing system 40 is illustrated as single device, the processing system 40 may comprise several distinct processing systems 40 that work in concert to achieve the functionality described herein.

The communication module 46 comprises one or more transceivers, modems, or other communication devices configured to enable communications with various other devices, at least including the trackers 20 and, in particular, via the network 60 using a suitable communication standard. The communication module 46 may further comprise hardware such as antennas, processors, memories, oscillators, or other hardware conventionally included with transceivers, modems, or other communication devices.

The processing system 40 may be operated locally or remotely by a user. To facilitate local operation, the processing system 40 may include an interactive user interface 48. Via the user interface 48, a user may access or modify the program instructions and may collect data from and store data to the memory 44. In at least one embodiment, the user interface 48 may suitably include an LCD display screen or the like, a mouse or other pointing device, a keyboard or other keypad, speakers, and a microphone, as will be recognized by those of ordinary skill in the art. Alternatively, in some embodiments, a user may operate the processing system 40 remotely from another computing device which is in communication therewith via the communication module 46 and has an analogous user interface.

As will be discussed in greater detail elsewhere herein, in response to detecting certain anomalous interactions, an alarm may be raised, a warning may be sent, or other ameliorative actions may be taken, which depend greatly on the application. In some embodiments, an alarm or warning might be presented on a display screen or other output device of the user interface. Similarly, in some embodiments, the user interface 48 includes an output device such as a speaker, siren, or the like and an alarm or warning might be provided using speaker or siren.

In at least one embodiment, the program instructions stored on the memory 44 include an interaction and anomaly detection program 50. As discussed in further detail below, the at least one processor 42 is configured to execute the interaction and anomaly detection program 50 to receive tracking and event information from the trackers 20 and process the tracking and event information to identify basic interactions between the people in the environment and objects or storage entities in the environment. Based on the identified person-object interactions, the at least one processor 42 is configured to associate individual persons with object and storage instances, detect and infer outcomes of their basic interactions, infer higher-level interactions, and detect any anomalous interactions.

Additionally, in at least one embodiment, data stored on the memory 44 includes entity and event data 52 which includes data regarding all of the tracked entities and detected events in the monitored environment. The entity and event data 52 may take the form of a plurality of logs, lists, text files, data tables, or the like. Particularly, in at least one embodiment, the entity and event data 52 takes the form of the defined Entity and Event classes, each of which has a defined set of attributes and data, which are discussed below.

Data Structures Used for Entity and Event Monitoring

Below we describe the data structures utilized for the various Entity and Event classes introduced above. In each case, a particular Entity or Event class has a defined set of attributes and data. However, it will be appreciated that the particular data structures described herein are merely exemplary and that any alternative data structures providing similar or equivalent functionality are intended to be within the scope of the disclosure.

Figure 5:
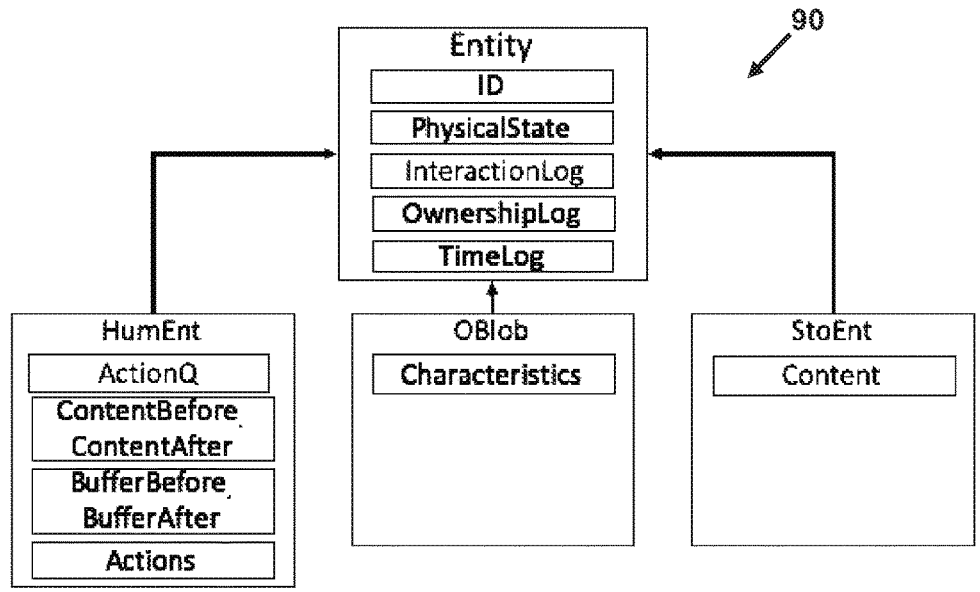
FIG. 5 shows an inheritance hierarchy and exemplary attributes for the various entity classes used by the system of FIG. 1.

FIG. 5 shows an inheritance hierarchy 90 and exemplary attributes for the various Entity classes introduced above. As suggested above, the HumEnt, OBlob, and StoEnt entity classes are subclasses of the root Entity class. Accordingly, the HumEnt, OBlob, and StoEnt entity classes inherit the attributes of the root Entity class. The Entity class, as well as its subclasses, include the attributes ID, PhysicalState, InteractionLog, OwnershipLog, and TimeLog. The Entity.ID attribute stores a unique identifier for each instance of the different entities. The Entity.PhysicalState attribute stores data related to the positional co-ordinates and other physical attributes of the real-world entity. The Entity.InteractionLog attribute comprises a time-sorted log that records all interaction history for the corresponding entity on an ongoing basis in the temporal order of occurrence. The Entity.OwnershipLog attribute stores ownership relationships between the different entities, depending on the application. In at least one embodiment, the Entity.OwnershipLog attribute includes has two lists: (1) Owns which stores information (pointers) for the entity instances that the respective entity instance is the owner of, and (2) Owned_by which stores information (pointers) for the entity instances that owns the respective entity instance. Finally, the Entity.TimeLog attribute stores the time related information, such as timestamps for events that occur involving the respective entity. Such timestamps might include times for HandIn events ($t_{in}$) and HandOut events ($t_{out}$), a time of entry ($t_{entry}$) or a time of exit ($t_{exit}$) for HumEnt entities, and a time of instantiation ($t_{instantiate}$) or a time of return ($t_{return}$) for StoEnt entities.

The HumEnt subclass, and any subclasses thereof, further include the attributes ActionQ, BufferBefore, BufferAfter, ContentBefore, ContentAfter, and Actions. The HumEnt.ActionQ attribute records all the interaction information for each of the different OBlob entities that the HumEnt instance has interacted with and comprises a plurality of rows corresponding to the different OBlob entities. In at least one embodiment, the HumEnt.ActionQ attribute maintains the interaction history in the temporal order of occurrence in separate lists for each OBlob that the HumEnt instance interacted with. The HumEnt.BufferBefore and HumEnt.BufferAfter attributes are used for temporarily storing the storage content (i.e., a list of OBlob entities) of a StoEnt before and after multiple concurrent interactions that the HumEnt instance was involved in, at any particular moment. Multiple such entries are indexed using unique key pairs. The HumEnt.ContentBefore and HumEnt.ContentAfter attributes are primarily used for computation and store the storage content of a StoEnt before and after a particular interaction that the HumEnt instance was involved in. The HumEnt.Actions attribute stores a list of different types of actions that the HumEnt instance can perform, specific to the application.

The StoEnt subclass, and any subclasses thereof, further include the attribute Content. The StoEnt.Content attribute maintains time-sorted storage content information (i.e., lists of OBlob entities) for the particular StoEnt instance, with corresponding timestamps.

The OBlob subclass, and any subclasses thereof, further include the attribute Characteristics. The OBlob.Characteristics attribute stores information related to the characteristics of the object specific to the application. For example, in the airport security checkpoint context, the OBlob.Characteristics attribute could store a classification defining the security threat posed and, in the automated retail store context, the OBlob.Characteristics attribute could store a price of the item of merchandise for automated billing.

Figure 6:
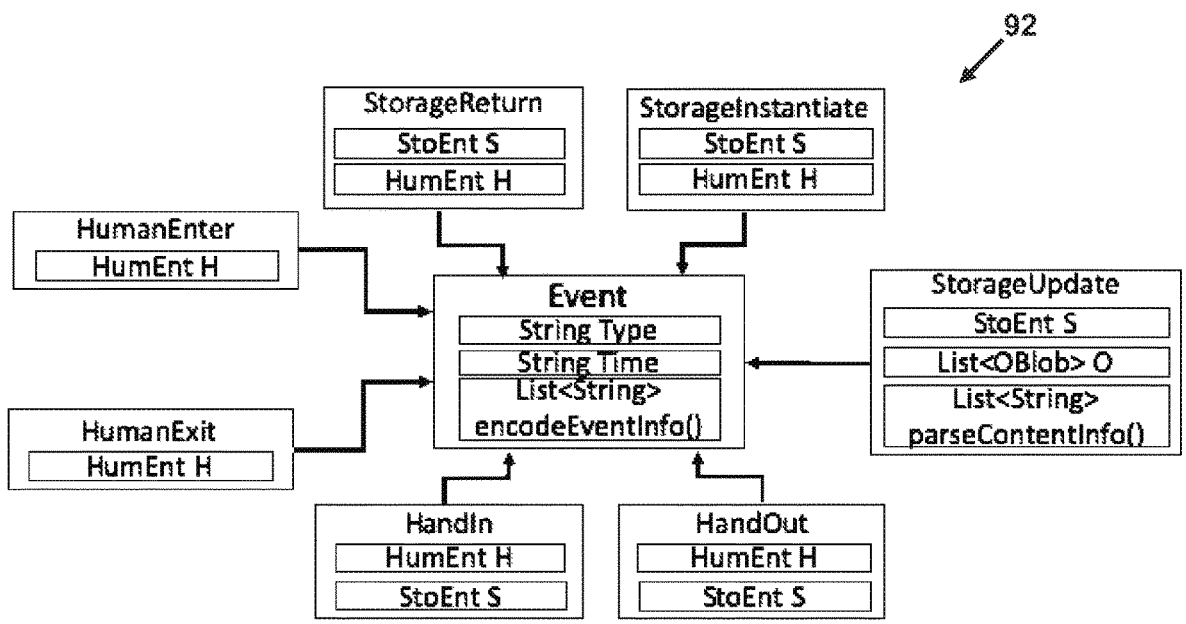
FIG. 6 shows an inheritance hierarchy and exemplary attributes for the various event classes used by the system of FIG. 1.

FIG. 6 shows an inheritance hierarchy 92 and exemplary attributes for the various Event classes introduced above. As suggested above, the HumanEnter, HumanExit, HandIn, HandOut, StorageInstantiate, StorageReturn, and StorageUpdate event classes are subclasses of the root Event class. Accordingly, the HumanEnter, HumanExit, HandIn, HandOut, StorageInstantiate, StorageReturn, and StorageUpdate event classes inherit the attributes of the root Event class. The Event class, as well as its subclasses, include the attributes Type and Time. The Type attribute is a string identifying the specific event type of the event and the Time attribute is a timestamp string indicating when the event occurred. The Event class also has a member function List <String> encodeEventInfo( ) that encodes information related to the event type, the timestamp, and the information regarding the entities involved with the specific event in the following format:

[Type, Time, Information Regarding Entities Involved in the Event].

The HumanEnter event class includes attributes that identify the HumEnt instance H that entered the monitored environment. Similarly, the HumanExit event class includes attributes that identify the existing HumEnt instance H that exited the monitored environment. The HandIn event class includes attributes that identify the StoEnt instance S that was reached into and the HumEnt instance H who reached into the StoEnt instance S. Similarly, the HandOut event class includes attributes that identify the StoEnt instance S from which a hand came out and the HumEnt instance H whose hand came out of the StoEnt instance S.

The StorageInstantiate event class includes attributes that identify the StoEnt instance S that was instantiated and the HumEnt instance H who instantiated the StoEnt instance S. Similarly, the StorageReturn event class includes attributes that identify the existing StoEnt instance S that was returned and the HumEnt instance H who returned the StoEnt instance S. Finally, the Storage Update event class includes attributes that identify the StoEnt instance S whose storage content is updated and a list of OBlob instances O that are stored in the StoEnt instance S. The Storage Update event class also has a member function List <String> parseContentInfo( ) that parses the information related to the different OBlob instances present inside the StoEnt instance S at any particular moment in time.

In some embodiments, the data structures described above for the various Entity and Event classes operate not only for storing information, but also for communicating information in an asynchronous manner between different processes or modules of the software architecture of the system 10.

Methods and Software Architecture for Person-Object Interaction Tracking

Methods and software architectures for operating the system 10 are described below. Particularly, various methods, processes, and/or modules are described for receiving and processing the tracking and event information from the trackers 20 to detect basic interactions between the people in the environment with objects or storage entities in the environment, associate individual persons with particular objects and storage entities, detect and infer outcomes of the basic interactions, infer higher-level interactions, and detect any anomalous interactions. In the description of the methods, processes, and/or modules, statements that a method, process, and/or module is performing some task or function refers to a processor, controller, or the like executing corresponding programmed instructions stored in non-transitory computer readable storage media operatively connected to the processor to manipulate data or to operate one or more components in the system 10 to perform the task or function. Particularly, the at least one processor 42 above may be such a processor and the executed program instructions may be stored in the memory 44. Additionally, the steps or operations of the methods, processes, and/or modules may be performed in any feasible chronological order, regardless of the order shown in the figures or the order in which the steps or operations are described.

The methods and software architectures discussed herein advantageously improve the operation of the processing system 40 by providing an event-driven architecture which is highly modular, scalable, and decentralized. Additionally, the methods and software architectures are advantageously designed to be substantially domain agnostic, meaning that it can be used to automate a wide variety of human-centric applications that involve humans interacting with objects, with only minor tweaks.

Figure 7:
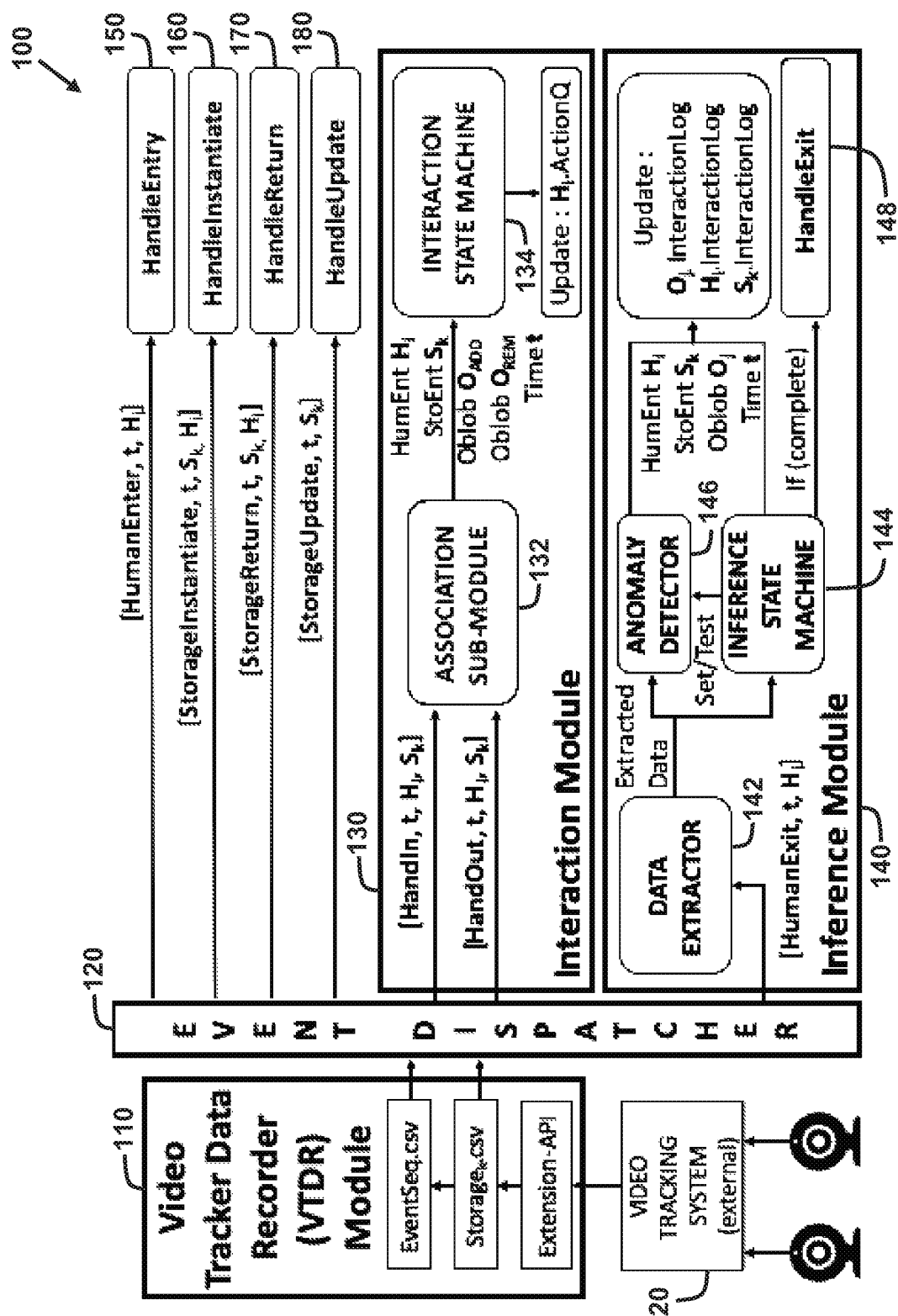
FIG. 7 shows software architecture for detecting and inferring interactions and associations between people, objects, and storage entities in a monitored environment.

FIG. 7 shows the software architecture 100 for detecting and inferring interactions and associations between people, objects, and storage entities in a monitored environment. Particularly, the software architecture 100 is an exemplary embodiment of the interaction and anomaly detection program 50 of the processing system 40, discussed above. In the illustrated embodiment, the software architecture 100 is comprised of various modules including a video tracker data recorder (VTDR) module 110, an event dispatcher module 120, an interaction module 130, an inference module 130, and an inference module 140. The software architecture 100 also includes various other independent event handlers including an entry handler 150, an instantiation handler 160, a return handler 170, and an update handler 180. The interaction module 130 includes an association submodule 132 and an interaction state machine submodule 134. The inference module 140 includes a data extractor submodule 142, an inference state machine submodule 144, an anomaly detector submodule 146, and an exit handler 148.

It will be appreciated, however, that the various modules, state machines, and handlers are merely functionally distinct components the software architecture 100 and/or the interaction and anomaly detection program 50. In some embodiments, each of the modules and/or handlers may correspond to one or more independent processes or threads that are executed in parallel by the at least one processor 42. As used in this context, a "process" refers to a unique instance of a set of computer program instructions which are executed on a processor, generally in parallel with other processes. Generally, a process has at least one thread of execution (or simply "thread") and may include several threads of execution. A particular set of data may be associated with each particular process. In some embodiments, the processes corresponding to certain modules and/or handlers may be executed on a single processor 42 of the processing system 40, on different physically distinct processors 42 in the processing system 40 or on entirely different processing systems 40.

With continued reference to FIG. 7, the at least one processor 42 of the processing system 40 is configured to execute program instructions of the VTDR module 110 to receive tracking and event information from the trackers 20 (illustrated as the video tracking system (external) 20, in the embodiment of FIG. 7). In other words, the VTDR module 110 is the process of the software architecture 100 that communicates with the trackers 20 directly. As will be discussed in greater detail elsewhere herein, the VTDR module 110 has a Remote Method Invocation (RMI) based Extension-Application Programming Interface (Extension-API or E-API) configured to enable the trackers 20 to directly send tracking and event information to the processing system 40. The at least one processor 42 timestamps and records the tracking and event information received via the E-API in an encoded format to one or more data files (e.g., comma-separated value files), which may be stored in the memory 44. In particular, in the illustrated embodiment, the at least one processor 42 writes event information from multiple trackers 20 in an encoded format into a EventSeq.csv file and writes storage content information for each StoEnt instance in separate $Storage_k$.csv files, where k correspond to the particular StoEnt instance. This timestamped and encoded information in the one or more data files plays an important role in the temporal sequencing of the events that may be received simultaneously from multiple trackers 20.

The at least one processor 42 of the processing system 40 is configured to execute program instructions of the event dispatcher module 120 to decode the encoded event information sequentially in the temporal order of occurrence from the data recorded in the EventSeq.csv and the Storage$_k$.csv files. The at least one processor 42 dispatches and/or broadcasts the decoded events to trigger the appropriate modules or event handlers in the software architecture 100. In particular, the HumanEnter event triggers the entry handler 150, the StorageInstantiate event triggers the instantiation handler 160, the StorageReturn event triggers the return handler 170, the StorageUpdate event triggers the update handler 180, the HandIn and HandOut events trigger the interaction module 130, and the HumanExit event triggers the inference module 140.

The at least one processor 42 of the processing system 40 is configured to execute program instructions of the interaction module 130 to, in response to a HandIn and/or HandOut event involving particular HumEnt instance H$_i$ and a particular StoEnt instance S$_j$, detect the elementary interactions that have occurred as a result of the a HandIn and/or HandOut. In particular, the at least one processor 42 detects an addition of an OBlob instance O$_{ADD}$ into the StoEnt instance S$_j$ by the HumEnt instance H$_i$ or a removal of an OBlob instance O$_{REM}$ from the StoEnt instance S$_j$ by the HumEnt instance H$_i$. The at least one processor 42 updates the attribute H$_i$.ActionQ based on the detected interactions.

As mentioned above, the interaction module 130 has two submodules: the association submodule 132 and the interaction state machine submodule 134. The at least one processor 42 is configured to execute program instructions of the association submodule 132 to establish associations between the OBlob, StoEnt and the HumEnt instances by monitoring changes in the storage content of the StoEnt instances due to the detected interactions. The at least one processor 42 is configured to execute program instructions of the interaction state machine submodule 134 to keep track of the elementary interactions between the HumEnt instances and the OBlob instances that are present in the different StoEnt instances. In at least one embodiment, the program instructions of the interaction state machine submodule 134 implement finite-state machine based logic. The finite-state machine logic associates different states with the entities and checks on the legality of the state transitions (for example, according to some application-specific ruleset) and, thus, adds robustness to the operation of software architecture 100.

The at least one processor 42 of the processing system 40 is configured to execute program instructions of the inference module 130 to, in response to a HumanExit event involving particular HumEnt instance H$_i$, make inferences from the elementary interactions of the particular HumEnt instance H$_i$ with each of the OBlob instances that the particular HumEnt instance H$_i$ interacted with. In particular, the at least one processor 42 is configured to make inferences with respect to the occurrence of certain higher-level interactions and the occurrence of certain anomalous interactions, which will depend on the particular application of the system 10. Based on the higher-level interactions and anomalous interactions detected, the at least one processor 42 updates the H$_i$.InteractionLog attributes, the O$_j$.InteractionLog attributes, and the S$_k$.InteractionLog attributes, as necessary. Once all of the inferences are have been made with respect to higher-level interactions and anomalous interactions, the at least one processor 42 triggers the exit handler 148. It will be appreciated, however, that in certain applications, the inference module 130 may be triggered in response to other events or in response to detecting particular interactions.

As mentioned above, the inference module 140 has three submodules: the data extractor submodule 142, the inference state machine submodule 144, and the anomaly detector submodule 146. The at least one processor 42 is configured to execute program instructions of the data extractor submodule 142 to extract an interaction history recorded by the interaction module 130 in a time-sequential manner for each OBlob instance that the particular exiting HumEnt instance H$_1$ interacted with and send this extracted interaction history to the inference state machine submodule 144 and the anomaly detector submodule 146. The at least one processor 42 is configured to execute program instructions of the inference state machine submodule 144 to infer higher-level interactions from the elementary interactions involving the HumEnt, OBlob, and StoEnt instances. In at least one embodiment, the program instructions of the inference state machine submodule 144 implement finite-state machine based logic. The at least one processor 42 is configured to execute program instructions of the anomaly detector submodule 146 to detect anomalous interactions and raise appropriate alarms and warnings.

Exploiting Data Parallelism with Concurrency and Communications

The data produced by the trackers 20 is inherently parallel. Most applications of the system 10 and the software architecture 100 will involve several trackers 20, in the form of video trackers, monitoring different sections of the environment and it is best for overall system efficiency if the events dealing with different individuals and different objects are be processed in parallel. Obviously, any attempts at exploiting this parallelism must not result in memory corruption and deadlock conditions should the computations being carried out in parallel access the same portions of the memory.

Two possible approaches to achieving concurrency in the software architecture 100 are multi-threading and multi-processing. Since threads can be thought of as lightweight processes, one main advantage of multithreading is that it is faster to create and destroy the threads and faster to access the objects in the memory that are meant to be shared by the threads. However, through synchronization and semaphores, multithreading requires greater care in ensuring that the memory meant to be shared by the different objects is not corrupted by the threads accessing the same object simultaneously. Additionally, there can be a third hybrid concurrency approach that benefits from the combination of the aforesaid multi-threading and multi-processing approaches.

Figure 8:
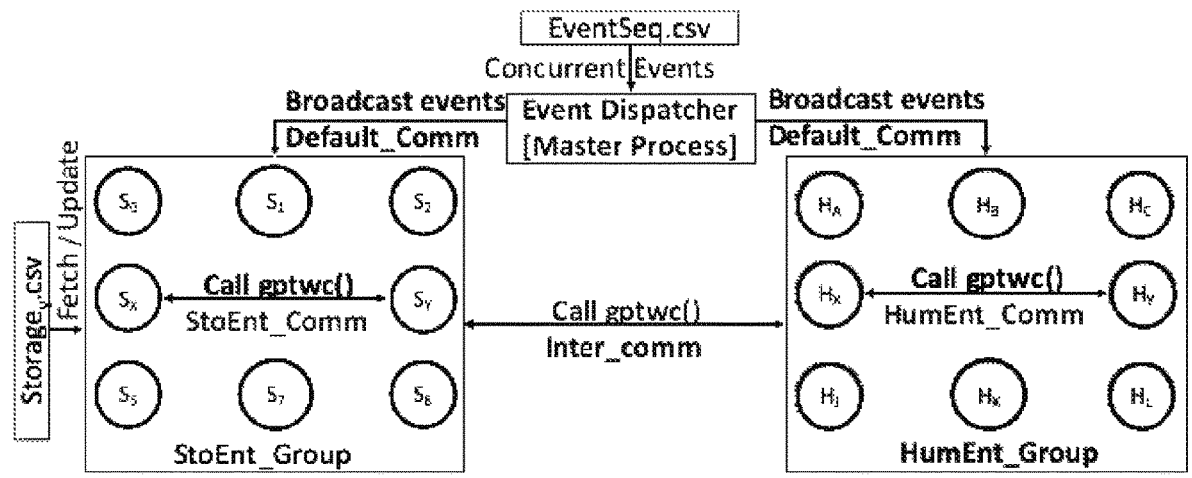
FIG. 8 illustrates a message passing interface (MPI) for intra-communication within process groups and for inter-communication between different process groups.

In at least one embodiment, the at least one processor 42 executes program instructions of the software architecture 100 to implement a multiprocessing approach having a master process and a plurality of worker processes. Alternatively, the same functionality can be implemented using a plurality of worker threads. Particularly, as each Entity instance is created—be it a HumEnt, StoEnt, or OBlob instance—it is assigned a separate worker process or separate worker threads by a master process of the software architecture 100. As shown in FIG. 8 the separate worker processes for similar entities that, except for the specific entity involved, are clones of the same basic process and are grouped into process groups. Particularly, as shown, processes H for HumEnt entities form the process group HumEnt_Group and processes S for StoEnt entities form the process group StoEnt_Group. Similarly, a multi-threaded implementation would have separate worker threads for similar entities that, except for the specific entity involved, are clones of the same basic threads and are grouped into thread groups.

In at least one embodiment, the at least one processor 42 executes program instructions of the software architecture 100 to implement a standard MPI (Message Passing Interface) or equivalent inter-thread communication framework for intra-communication within each process group and for inter-communication between different process groups. The MPI provides what are known as communicators for the communications between the processes in the same group and for communications between processes that belong to different groups. The messaging achieved with intra-communicators within each process group can work in both point-to-point mode, in which each process sends a message to one other specific process, and in broadcast mode, in which a process sends a message to all other sibling processes of the same process group. The messaging achieved with inter-communicators can work only in point-to-point mode in which a process of a particular group sends a message to a chosen process in another process group. Similar communications and collaborations can be achieved with a multi-threaded implementation of the disclosed system.

For an example of within-group communications with intra-communicators, consider a case in which the contents of all the StoEnt entities need to be updated at the same time, this would require using an intra-communicator in the broadcast mode. For an example that requires an intra-communicator in a point-to-point mode, consider a case in which an object that has been transferred from one StoEnt instance to another StoEnt instance—an event detected and recorded by a tracker 20. To confirm this exchange, the receiving StoEnt instance would need to hear from the sending StoEnt instance.

The master process of the software architecture 100 uses the MPI's default communicator denoted Default_comm, to dispatch events to all worker process groups, meaning the worker processes in the HumEnt_Group process group and the worker processes in the StoEnt_Group process group. The intra-communicator for communicating between the HumEnt_Group and StoEnt_Group process groups is denoted Inter_comm. Finally, the intra-communicators within the HumEnt_Group and StoEnt_Group process groups are denoted HumEnt_comm and StoEnt_comm, respectively.

As an example, a particularly useful application of the inter-communicator is in fetching storage content information from a worker process in the StoEnt_Group when a HandIn or a HandOut event is recorded. The information about the storage content and the entities involved can be subsequently used to trigger the downstream finite-state based logic for checking the legality of the event and the legality of the consequences of the event.

Figure 9:
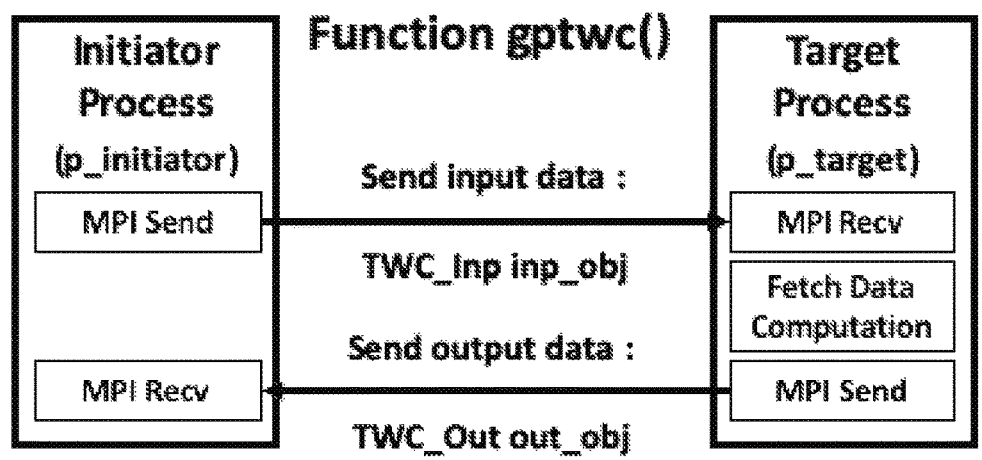
FIG. 9 illustrates usage of MPI communicators for passing messages between the processes and fetching data from the processes that may be subject to computations at the receiving end prior to execution of the fetch operation.

With reference to FIG. 9, usage of the communicators for passing messages between the processes and fetching data from the processes is shown. Particularly, in one embodiment, the software architecture 100 defines an MPI based function gptwc( ), whose name stands for: "General Purpose Two-way Communication". This function is general purpose in the sense that it can be used to create a communication link between any two processes. More precisely speaking, a process that wants to establish a two-way communication link with another process, will invoke this function in the manner we discuss below. Note that the process that wants to establish a communication link is denoted the initiator process and the other process of the communication link is denoted target process.

The signature of the gptwc( ) function is as follows:
TWCOut gptwc(Comm comm_name, String oper_type, int p_initiator, int p_target, TWCInp inp_obj).

In FIG. 9, the initiator process would like to send a data object inp_obj, of type TWC_inp, to the target process and to receive from the target process a result in the form of a data object denoted out_obj of type TWC_Out. With respect to the signature of the gptwc( ) function, the first parameter comm_name is set to the communicator needed for the two-way communication link. The second parameter oper_type indicates the specific type of functionality that needs to be executed by the target process. The third parameter p_initiator is the initiator process rank that requested the two-way communication link. By the same token, the fourth parameter p_target is the target process rank that is the target process of the communication link. Finally, the fifth parameter inp_obj is an instance of the class TWCInp that has two attributes: (1) d_input, which is set to the data block being sent by the initiator process to the target process; and (2) mode, which is used to notify the target process the type of operation it needs to perform as follows:

$$mode = \begin{cases} 0: \text{Fetch Data using d\_input} \\ 1: \text{Compute operation on d\_input} \\ 2: \text{Fetch using d\_input followed by a compute operation} \end{cases}$$

The gptwc( ) function returns an instance out_obj of the class TWCOut which also has two attributes: (1) d_output, which is set to the result that the initiator process is expecting from the target process; and (2) status that indicates if any errors were encountered when processing the data object sent over by the initiator process. When status has a value of 1, it signifies success, and when status has any other values, it denotes specific types of errors.

Video Tracker Data Recorder (VTDR) Module

Figure 10:
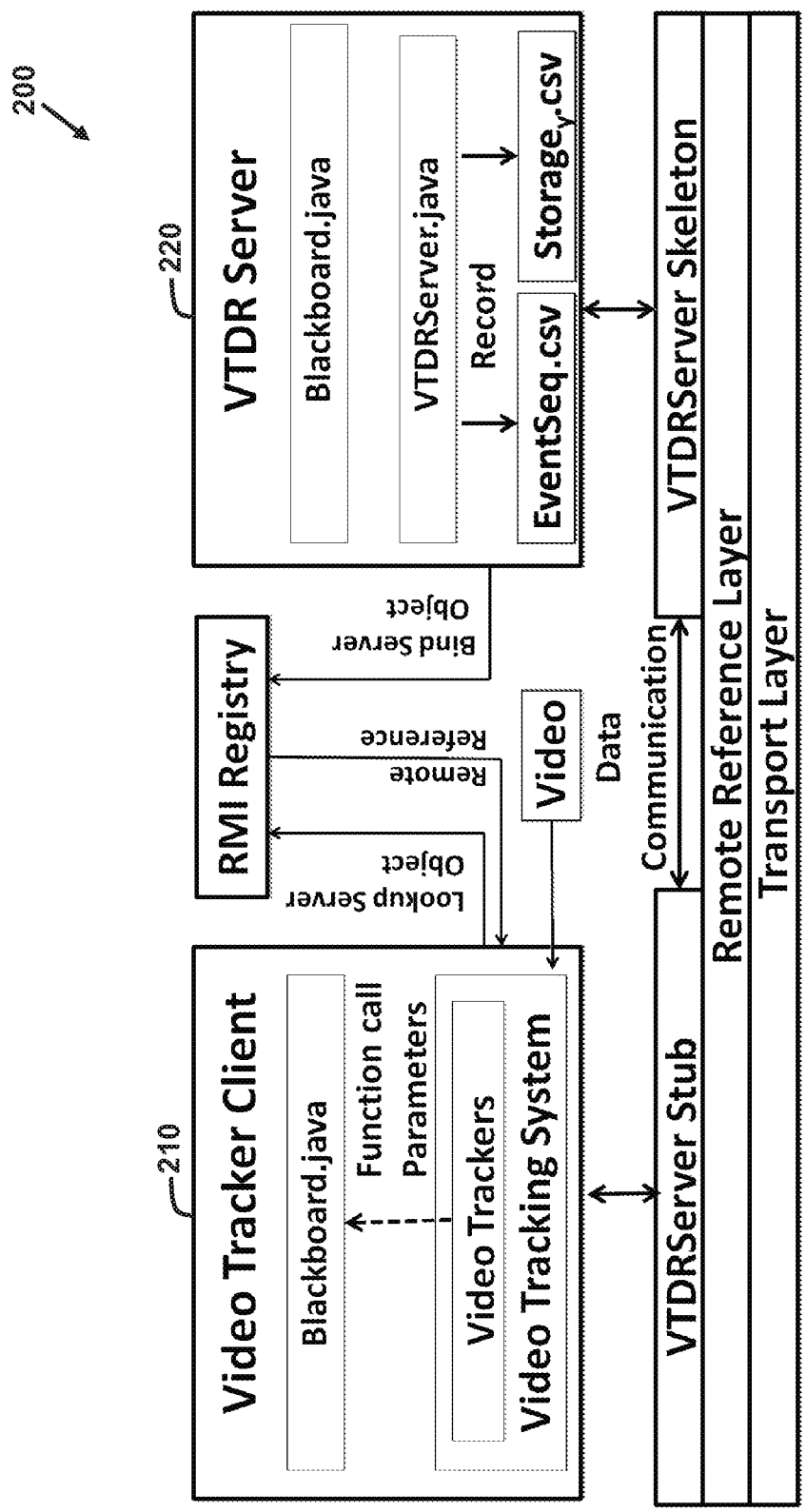
FIG. 10 shows detailed architecture for the video tracker data recorder (VTDR) module of the software architecture of FIG. 7.

FIG. 10 shows a detailed architecture 200 for the VTDR module 110. The architecture 200 for the VTDR module 110 includes a VDTR server 220 which interfaces with a video tracker client 210 (which corresponds generally to the entity and event tracking program 32 of FIG. 4) that runs on each of the trackers 20. The at least one processor 42 executes program instructions of the VDTR server 220 to provide a Remote Method Invocation (RMI), such as Java RMI, based Extension-API (E-API) configured to enable the trackers to directly send tracking and event information to the processing system 40. The E-API is a plug-n-play interface such that the video tracker client 210 that runs on each of the trackers 20 only needs to implement a set of functions declared in the E-API of the VDTR server 220 to be able to exchange information seamlessly therewith. By calling the RMI stub classes, the video tracker client 220 would be able to write information to VTDR server's memory.

The processor 22 of each tracker 20 executes program instructions of the video tracker client 210 to invoke, through an RMI registry, the designated functions defined in the Blackboard interface (illustrated as Blackboard.java and referred to elsewhere as the E-API) on the stub of the VTDRServer class. It will be appreciated that, in the language of the RMI, a "client" refers to the machine that wants to invoke a certain functionality in the namespace of another machine, which is referred to as the "server." The distributed object programming made possible by RMI is founded on the tenet that to a client a remote object should appear as if it were available locally. In other words, after a client has located the remote object on the server, the client's invocation of the methods of the server object should have the same syntax as the methods of an object local to the client machines in a computer network.

The E-API of the VTDR module 110 sits on top of the RMI, which allows for asynchronous interactions between the VTDR module 110 and multiple trackers 20. As each event occurs, the processor 22 of the tracker 20 invokes the function from the E-API on the stub of our VTDRServer class. When the tracker 20 invokes such a function on the stub, the stub either initiates a new connection with the server process of the VTDR server 220 or utilizes a connection established in a previous such function invocation. Subsequently, the tracker 20 marshals the arguments in the function call over the connection and waits for the results (or status code) to come back which indicates a successful function execution on the server object.

The Blackboard interface is a pure interface with a function declaration that is implemented in the class VTDR-Server. The function signature is as follows:

void recordEventSequence(Event E), where Event is the superclass of all events that are detected by the tracker 20, as discussed above. Therefore, at runtime, an argument of type Event will actually be a derived instance of the specific event depending on the application. As discussed above, the child classes of the Event class use the classes in the Entity class hierarchy. Hence, when a tracker 20 downloads the stub for the VTDRserver class, it also downloads the Blackboard interface class and the stubs for all the classes in Entity class hierarchy.

It is important to note that a tracker 20 downloads only a stub version of the VTDRServer class and the tracker 20 only knows about the signatures of those functions of this class that are declared in the Blackboard interface. The tracker 20 has no access to any of the implementation code in the VTDRServer class.

Based on the information provided by a tracker 20 through the E-API, the at least one processor 42 executes program instructions of the VTDR server 220 to generate two types of files: (1) an EventSeq.csv file, which includes the sequence of encoded event information from multiple trackers 20 in the exact temporal sequence they occurred, and (2) a plurality of Storage$_Y$.csv files, which include the content of the each different StoEnt, where Y refers to the ID of the StoEnt instance.

Event Dispatcher Module

Returning to FIG. 7 and FIG. 8, the operations of the event dispatcher module 120 are discussed in further detail. The at least one processor 42 of the processing system 40 is configured to execute, particularly in a master process, program instructions of the event dispatcher module 120 to read and decode the encoded event information sequentially in the temporal order of occurrence from the EventSeq.csv file. In at least one embodiment, the concurrent event information from the trackers 20 is recorded in the following encoded format:

[Event Type, Event Time, Entity Information], where Event type corresponds to the event type (e.g., HumanEnter, HumanExit, StorageInstantiate, StorageReturn, Storage Update, HandIn, or HandOut), Event time corresponds to the time at which the event occurred, and Entity Information corresponds to the entities involved in the event (e.g., one or more instances $H_X$, $S_Y$, and/or $O_J$.

The at least one processor 42 dispatches and/or broadcasts the decoded events to trigger the appropriate modules or event handlers in the software architecture 100. Particularly, the at least one processor 42 broadcasts the decoded event information to the HumEnt and StoEnt worker processes using the Default_comm communicator (as shown in FIG. 8). The at least one processor 42, in the worker processes, then uses the decoded Entity Information received from the master process to determine which entities are involved in the event. The at least one processor 42, in the worker processes for the entities involved in the event, then calls the appropriate event handlers or modules to perform a variety of functions/computations based on the Event Type.

As mentioned above, in response to a HumanEnter event occurring involving a HumEnt instance $H_X$, the at least one processor 42 executes program instructions of the entry handler 150. Particularly, the at least one processor 42 assigns an available worker process from the HumEnt_Group process group and instantiates an instance derived from the HumEnt class, which depends on the application. Additionally, the at least one processor 42 initializes the new instance with a unique ID, updates the time of entry $t_{entry}$, and initializes the other data attributes thereof as necessary.

In response to a StorageInstantiate event occurring involving a StoEnt instance $S_Y$ and a HumEnt instance $H_X$, the at least one processor 42 executes program instructions of the instantiation handler 160. Particularly, the at least one processor 42 assigns an available worker process from the StoEnt_Group process group and instantiates an instance derived from the StoEnt class, which depends on the application. Additionally, the at least one processor 42 initializes the instance with a unique ID, updates the time of instantiation $t_{instantiate}$, and initializes the other data attributes thereof as necessary. Finally, if the StoEnt was instantiated by a HumEnt instance $H_X$, then the at least one processor 42 updates the ownership information in the Owned_by list in $S_Y$.OwnershipLog indicating that the owner of $S_Y$ is $H_X$ and the Owns list in $H_X$.OwnershipLog indicating that $H_X$ owns $S_Y$.

In response to a StorageReturn event occurring involving a StoEnt instance $S_Y$ and a HumEnt instance $H_X$, the at least one processor 42 executes program instructions of the return handler 170. Particularly, the at least one processor 42 updates the time of return $t_{return}$ and permanently records the entity information (e.g., in the memory 44). Additionally, the at least one processor 42 deletes the instance $S_Y$ and frees the allotted worker process, making the worker process available again in the StoEnt_Group process group.

In response to a Storage Update event occurring involving a StoEnt instance $S_Y$ and one or more OBlob instances $O_J$, the at least one processor 42 executes program instructions of the update handler 180. Particularly, the at least one processor 42 notifies the worker process for StoEnt instance $S_Y$ that new content information is available from the trackers 20. Consequently, at least one processor 42 fetches the latest OBlob content from the corresponding Storage$_Y$.csv file (as shown in FIG. 8) and updates $S_Y$.Content based on the latest OBlob content.

In response to a HandIn event or a HandOut event occurring involving a HumEnt instance $H_X$ and a StoEnt instance $S_Y$, the at least one processor 42 executes program instructions of the interaction module 130 to detect elementary interactions relating to the event (discussed in detail below).

In response to a HumanExit event occurring involving a HumEnt instance $H_X$, the at least one processor 42 executes program instructions of the inference module 140 to detect higher-level interactions and anomalous interactions (discussed in detail below). Once all inferences are made, the at least one processor 42 executes program instructions of the exit handler 148 to update the time of exit $t_{exit}$ and permanently record the entity information (e.g., in the memory 44). Additionally, the at least one processor 42 deletes the instance $H_X$ and frees the allotted worker process, making the worker process available again in the HumEnt_Group process group.

Interaction Module

With continued references to FIG. 7, the operations of the interaction module 130 are discussed in further detail. The at least one processor 42 of the processing system 40 is configured to execute program instructions of the interaction module 130 to detect elementary interactions in the monitored environment, such as the addition of OBlob instances to the StoEnt instances and the removal of OBlob instances from the StoEnt instances. Additionally, the at least one processor 42 executes program instructions of the interaction module 130 to associate OBlob instances with the StoEnt instances involved in the interaction with the HumEnt instance involved in the interaction. In one embodiment, the at least one processor 42 executes program instructions of the interaction module 130 in response to every event involving a HumEnt instance and OBlob instances contained within StoEnt instances, or in other words, in response to every HandIn event or HandOut event. Since these events can happen concurrently in the real-world, the interaction module 130 is implemented such that the at least one processor 42 can handle concurrent events which are not only interleaved in time, but can also handle complicated sequence of events such as one involving multiple members of the same HumEnt instance and different StoEnt instances at the same instant of time or within a short window of time.

The interaction module 130 is implemented so as to be robust with respect to missed event detections by the trackers 20 and also with respect to any falsely detected events by the trackers 20. For example, in the case of video trackers 20, it should be appreciated that in certain common circumstances, not all the objects in a StoEnt instance are detected in every image frame. For example, objects in a StoEnt instance may be occluded by the hand of a HumEnt instance or may be temporarily undetected due to a change in ambient conditions. These variations in the detected objects might lead to inconsistencies, if not handled robustly. For example, in one embodiment, the at least one processor 42 only considers the storage content before a hand has entered the StoEnt area and after the hand has left thereby eliminating the inconsistencies introduced due to temporary occlusion during an interaction. An additional source of difficulty arises from the fact that when a hand that is trying to reach an object in a StoEnt instance moves too suddenly, it may not be detected in one or more frames until the image of the hand stabilizes. In one embodiment, the at least one processor 42 provides some protection against such effects by filtering out momentary fluctuations in the detections reported to the interaction module 130. Alternatively, the processor 22 of the trackers 20 may preform filtering prior to recording data to protect against momentary fluctuations.

Every elementary interaction detected by the interaction module 130 starts with a HandIn event and ends with a HandOut event. The at least one processor 42 is configured to determine an interaction to be valid, only if both a HandIn event and a HandOut event have been reported by the trackers 20. In response to any HandIn event without a matching HandOut event being reported or any HandOut event without a matching HandIn event being reported (referred to herein as "noisy" hand-based events), the at least one processor 42 is configure filter out these noisy hand-based events, determine them to invalid, and raise a warning/alarm.

As mentioned above, the interaction module 130 includes an association submodule 132. The at least one processor 42 is configured to execute program instructions of the association submodule 132 to establish associations between the OBlob, StoEnt and HumEnt instances by detecting changes in the storage content of StoEnt instances due to HandIn and HandOut events. In particular, the at least one processor 42 compares the storage content of StoEnt instances before and after a valid interaction, determines a change in the OBlob instances as a result of the interaction, and passes information regarding the change in the OBlob instances to the interaction state machine submodule 134.

Figure 11:
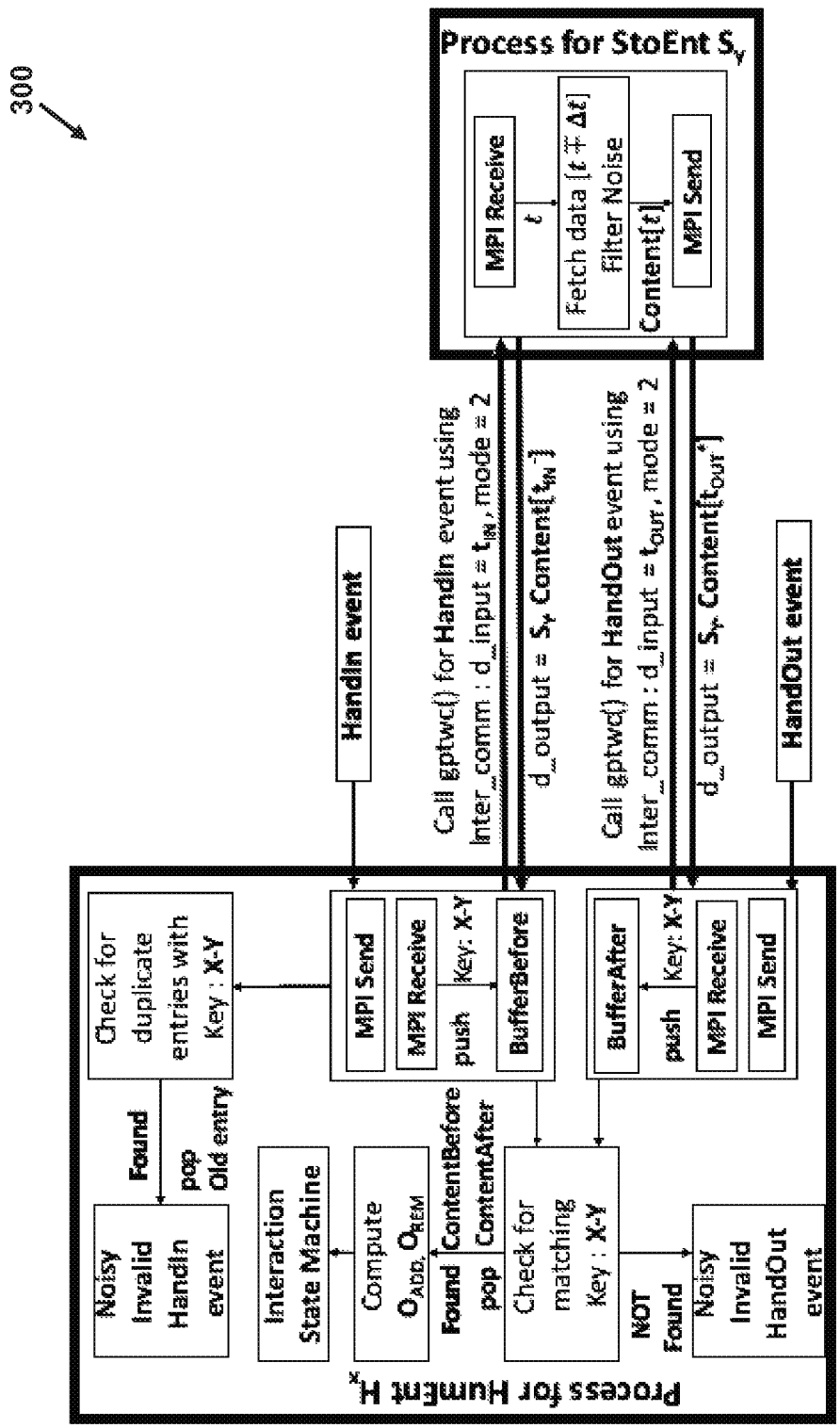
FIG. 11 shows detailed architecture for the association submodule of the interaction module of the software architecture of FIG. 7.

FIG. 11 shows detailed architecture 300 of the association submodule 132 for handling an exemplary interaction between a HumEnt instance $H_X$ and a StoEnt instance $S_Y$. The HumEnt instance $H_X$ has been previously assigned a worker process $P(H_X)$ and the StoEnt instance $S_Y$ as been previously assigned a worker process $P(S_Y)$. The at least one processor 42 receives, with the worker process $P(H_X)$, from the event dispatcher module 120, information regarding a HandIn event at time $t_{in}$ corresponding to the start of an interaction and a HandOut event at time $t_{out}$ corresponding to the end of the interaction. In response to both the HandIn event and the HandOut event, the at least one processor 42 utilizes a gptwc( ) function call with mode=2 using the inter-communicator Inter_comm between the worker processes $P(H_X)$ and $P(S_Y)$, where the worker process $P(H_X)$ is the initiator process and the worker process $P(S_Y)$ is the target process.

The HumEnt instances have a specialized dictionary-like buffer data structure that stores information pertaining to concurrently occurring interactions temporarily and is used to filter out noisy invalid events effectively. Each entry in this buffer stores the content information (List <OBlob> $S_Y$.Content(t)), at interaction time t returned by a gptwc( ) function call between the worker processes $P(H_X)$ and $P(S_Y)$ with an associated unique key pair (X–Y), which denotes the IDs of the interacting HumEnt instance $H_X$ and StoEnt instance $S_Y$. Thus the corresponding buffer entry would be:

$$|(X-Y):-:S_Y.\text{Content}(t)|.$$

Additionally, the association submodule 132 is implemented so as to effectively handle situations in which multiple members associated with the same HumEnt instance interacts with multiple StoEnt instances at the same time. In this case, the at least one processor 42 assigns the unique key pairs (X–Y) such that each interaction will have a different key pair (X–Y), in which X will remain same but Y will be different for different StoEnt instances.

Each HumEnt instance has two such buffer data attributes: BufferBefore and BufferAfter, which were discussed briefly above, for storing the results returned by a gptwc( ) function call for HandIn and HandOut events respectively.

In response to a HandIn event, the at least one processor 42 sends, with the worker process $P(H_X)$, the time $t_{in}$ to the worker process $P(S_Y)$, using the gptwc( ) function. The at least one processor 42 fetches, with the worker process $P(S_Y)$, the storage content of the StoEnt instance $S_Y$ before the time $t_{in}$ (denoted symbolically as $t_{in}^-$). In at least one embodiment, the at least one processor 42 filters the noise across multiple timestamps before the time $t_{in}$ in order to arrive at more accurate storage content information. The filtering may comprise removing momentary outlier content, or a similar noise reduction process. The at least one processor 42 sends, with the worker process P(S$_Y$), the storage content information (S$_Y$.Content(t$_{in}^-$)) to the worker process P(H$_X$). The at least one processor 42 pushes and/or writes, with the worker process P(H$_X$), the storage content information to into H$_X$.BufferBefore as:

$$S_Y.Content(t_{in}^-) \xrightarrow[X-Y]{push} H_X.BufferBefore.$$

Similarly, in response to a HandOut event, the at least one processor 42 sends, with the worker process P(H$_X$), the time t$_{out}$ to the worker process P(S$_Y$), using the gptwc( ) function. The at least one processor 42 fetches, with the worker process P(S$_Y$), the storage content of the StoEnt instance S$_Y$ after the time t$_{out}$ (denoted symbolically as t$_{out}^+$). In at least one embodiment, the at least one processor 42 filters the noise across multiple timestamps after the time t$_{out}$ in order to arrive at more accurate storage content information. The filtering may comprise removing momentary outlier content, or a similar noise reduction process. The at least one processor 42 sends, with the worker process P(S$_Y$), the storage content information (S$_Y$.Content(t$_{out}^+$)) to the worker process P(H$_X$). The at least one processor 42 pushes and/or writes, with the worker process P(H$_X$), the storage content information to into H$_X$.BufferAfter as:

$$S_Y.Content(t_{out}^+) \xrightarrow[X-Y]{push} H_X.BufferAfter.$$

After the storage content information has been written to H$_X$.BufferBefore and H$_X$.BufferAfter, the at least one processor 42 checks, with the worker process P(H$_X$), if there is a matching entry with the same key pair (X-Y) in H$_X$.BufferBefore and H$_X$.BufferAfter, which corresponds to a valid interaction between the HumEnt instance H$_X$ and StoEnt instance S$_Y$. In at least one embodiment, the at least one processor 42 is configured to perform this checking, in each case, is response to receiving a HandOut event and writing an entry to H$_X$.BufferAfter. In response to finding a matching entry with the same key pair (X-Y), the at least one processor 42 pops and/or writes, with the worker process P(H$_X$), the corresponding storage content information from H$_X$.BufferBefore to H$_X$.ContentBefore and from H$_X$.BufferAfter to H$_X$.ContentAfter as follows:

$$H_X.BufferBefore \xrightarrow[X-Y]{pop} H_X.ContentBefore$$

$$H_X.BufferAfter \xrightarrow[X-Y]{pop} H_X.ContentAfter$$

$$\Rightarrow H_X.ContentBefore = S_Y.Content(t_{in}^-)$$

$$\Rightarrow H_X.ContentAfter = S_Y.Content(t_{out}^+).$$

In at least one embodiment, the at least one processor 42 is configured to delete the matching entries with the same key pair (X-Y) the from H$_X$.BufferBefore and from H$_X$.BufferAfter after popping and/or writing the storage content information to H$_X$.ContentBefore and H$_X$.ContentAfter.

After storage content information has been written to H$_X$.ContentBefore and H$_X$.ContentAfter, the at least one processor 42 determines, with the worker process P(H$_X$), the objects added (O$_{ADD}$) to the StoEnt instance S$_Y$ and/or the objects removed (O$_{REM}$) from the StoEnt instance S$_Y$ as a result of the interaction by computing the set differences as follows:

$$O_{ADD} = H_X.ContentAfter - H_X.ContentBefore$$

$$O_{REM} = H_X.ContentBefore - H_X.ContentAfter.$$

Finally, the at least one processor 42 passes, with the worker process P(H$_X$), the extracted information O$_{ADD}$ and O$_{REM}$ to the interaction state machine submodule 134 for further processing, as discussed below.

In some cases, the worker process P(H$_X$) will receive information for a HandOut event without a matching HandIn event between the HumEnt instance H$_X$ and StoEnt instance S$_Y$. In such a case, there will be no entry in H$_X$.BufferBefore with the matching key pair (X-Y). In response to finding an entry in H$_X$.BufferAfter without a matching entry in H$_X$.BufferBefore having the key pair (X-Y), the at least one processor 42 determines, with the worker process P(H$_X$), that the entry in H$_X$.BufferAfter corresponds to a noisy invalid HandOut event. In this case, no information is passed to the interaction state machine submodule 134 for further processing and the interaction state machine submodule 134 is not triggered. In one embodiment, the at least one processor 42 deletes the erroneous entry from H$_X$.BufferAfter if it is deemed to correspond to a noisy invalid HandOut event.

Similarly, in some cases, the worker process P(H$_X$) will receive information for a HandIn event without ever receiving a matching HandOut event between the HumEnt instance H$_X$ and StoEnt instance S$_Y$. In such a case, there will be no entry in H$_X$.BufferAfter with the matching key pair (X-Y). Eventually, the worker process P(H$_X$) may receive another HandIn event between the HumEnt instance H$_X$ and StoEnt instance S$_Y$, thereby creating a second entry in H$_X$.BufferBefore with the same key pair (X-Y). In response to finding two or more entries in H$_X$.BufferBefore with the same key pair (X-Y), the at least one processor 42 determines, with the worker process P(H$_X$), that the earlier duplicate entry in H$_X$.BufferBefore corresponds to a noisy invalid HandIn event and deletes the earlier entry from. In this case, no information is passed to the interaction state machine submodule 134 for further processing and the interaction state machine submodule 134 is not triggered. In one embodiment, the at least one processor 42 is configured to, in each case, check for duplicate entries in H$_X$.BufferBefore with the same key pair (X-Y) in response to receiving a HandIn event and writing an entry to H$_X$.BufferBefore. In one embodiment, the at least one processor 42 deletes the erroneous entry from H$_X$.BufferBefore if it is deemed to correspond to a noisy invalid HandIn event.

Figure 12:
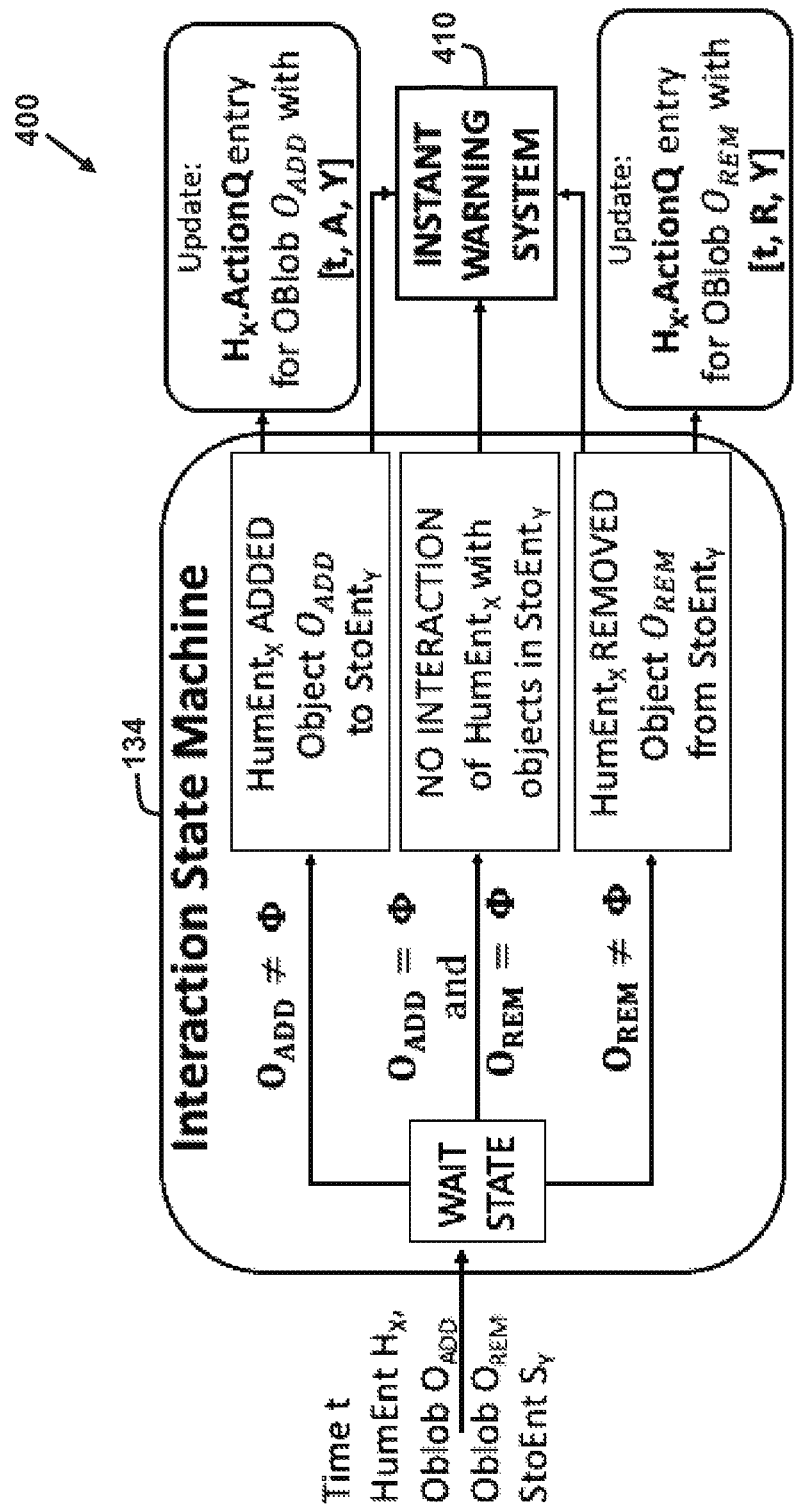
FIG. 12 shows detailed architecture for the interaction state machine submodule of the interaction module of the software architecture of FIG. 7.

FIG. 12 shows detailed architecture 400 for the interaction state machine submodule 134 for handling an exemplary interaction between a HumEnt instance H$_X$ and a StoEnt instance S$_Y$. Particularly, the at least one processor 42 executes program instructions of the interaction state machine submodule 134 to implement finite-state machine based logic to keep track of the elementary interactions between the HumEnt instances and the OBlob instances that are present in the different StoEnt instances. The at least one processor 42 monitors the extracted storage content information O$_{ADD}$ and O$_{REM}$ received from the association module 132 to determine if any OBlob instances were added or removed as a result of the interaction and updates the ActionQ for the HumEnt instance H$_X$, as necessary.

In a wait state, the interaction state machine submodule 134 receives the extracted storage content information O$_{ADD}$ and $O_{REM}$ from the association module 132 In response to an object $O_{ADD}$ being added to the StoEnt instance $S_Y$ (i.e., $O_{ADD} \neq \phi$) at the time t, the at least one processor 42 writes and/or appends the tuple [t, A, Y] to the row corresponding to the OBlob instance $O_{ADD}$ in the data attribute $H_X$.ActionQ, where t is the time, A indicates that the OBlob instance was added, and Y is the ID of the StoEnt instance $S_Y$. Similarly, in response to an object $O_{REM}$ being removed to the StoEnt instance $S_Y$ (i.e., $O_{REM} \neq \phi$) at the time t, the at least one processor 42 writes and/or appends the tuple [t, R, Y] to the row corresponding to the OBlob instance $O_{REM}$ in the data attribute $H_X$.ActionQ, where R indicates that the OBlob instance was removed. Finally, in response to no objects being added to or removed from the StoEnt instance $S_Y$ (i.e., $O_{ADD}=\phi$ and $O_{REM}=\phi$), the at least one processor 42 does not make any changes to the data attribute $H_X$.ActionQ. In this case, it could either mean that there is a matching noisy HandIn event and HandOut event or that the HumEnt instance $H_X$ interacted with the StoEnt instance $S_Y$, but did not displace any objects.

In one embodiment, the architecture 400 for the interaction state machine submodule 134 further includes an instant warning system 410 configured to raise system alerts immediately, if some anomalous interaction takes place. In one embodiment, the at least one processor 42 executes program instructions of the instant warning system 410 to determine if the HumEnt instance $H_X$ involved in an interaction is an owner of the StoEnt instance $S_Y$ he or she interacted with by checking if an entry for $S_Y$ exists in the data attribute $H_X$.OwnershipLog. Similarly, in one embodiment, the at least one processor 42 executes program instructions of the instant warning system 410 to determine if the HumEnt instance $H_X$ involved in an interaction is an owner of the OBlob instances $O_{ADD}$ or $O_{REM}$ that he or she added to or removed from the StoEnt instance $S_Y$ by checking if an entry for $O_{ADD}$ or $O_{REM}$ exists in the data attribute $H_X$.OwnershipLog. In certain applications in which ownership associations between HumEnt instances and StoEnt instances or OBlob instances are established, this determination may be used to identify an anomalous interaction. For example, in the airport security checkpoint context, an HumEnt instance interacting with a StoEnt instance that does not belong to him or her would be considered anomalous. However, it will be appreciated that the logic used to detect an anomalous interaction will depend on the particular application. In one embodiment, if an anomalous interaction is detected, the at least one processor 42 fetches the real owner of the StoEnt instance $S_Y$ or of the OBlob instances $O_{ADD}$ or $O_{REM}$ using a simple gptwc( ) function call between the worker process $P(H_X)$ (initiator process) and the worker process $P(S_Y)$ (target process) with mode=0. In one embodiment, if an anomalous interaction is detected, the at least one processor 42 generates an alert or other kind of system notification or records the anomaly in a log file.

It will be appreciated that the interaction module 130 handles various types storage content related noise robustly. Particularly, in the case that objects are missed or omitted from the storage content of a storage entity, the association submodule 132 filters the noise across multiple timestamps in order to arrive at more accurate storage content information, as discussed above. In the case of objects being occluded by a hand while the hand interacts with objects of a storage entity, the association submodule 132 only considers storage content before the hand(s) entered and after the hand(s) left the storage entity, as discussed above. Additionally, in the case of momentary fluctuations in the detected storage content of a storage entity, the trackers 20 perform initial filtering to eliminate such momentary fluctuations.

Similarly, the interaction module 130 handles various types of hand-event related noise robustly. Particularly, in the case of a noisy invalid HandIn event alone, the interaction state machine submodule 134 is not triggered and the erroneous entry in BufferBefore is cleared. In the case of a noisy invalid HandOut event alone, the interaction state machine submodule 134 is not triggered and the erroneous entry in BufferAfter is cleared. In the case of a noisy HandIn event followed by a noisy HandOut event between the same HumEnt and StoEnt instances in which there is no storage content noise (i.e., accurate storage content), the interaction state machine module 132 is triggered but identifies that there was no interaction and ActionQ is not appended.

Inference Module

Figure 13:
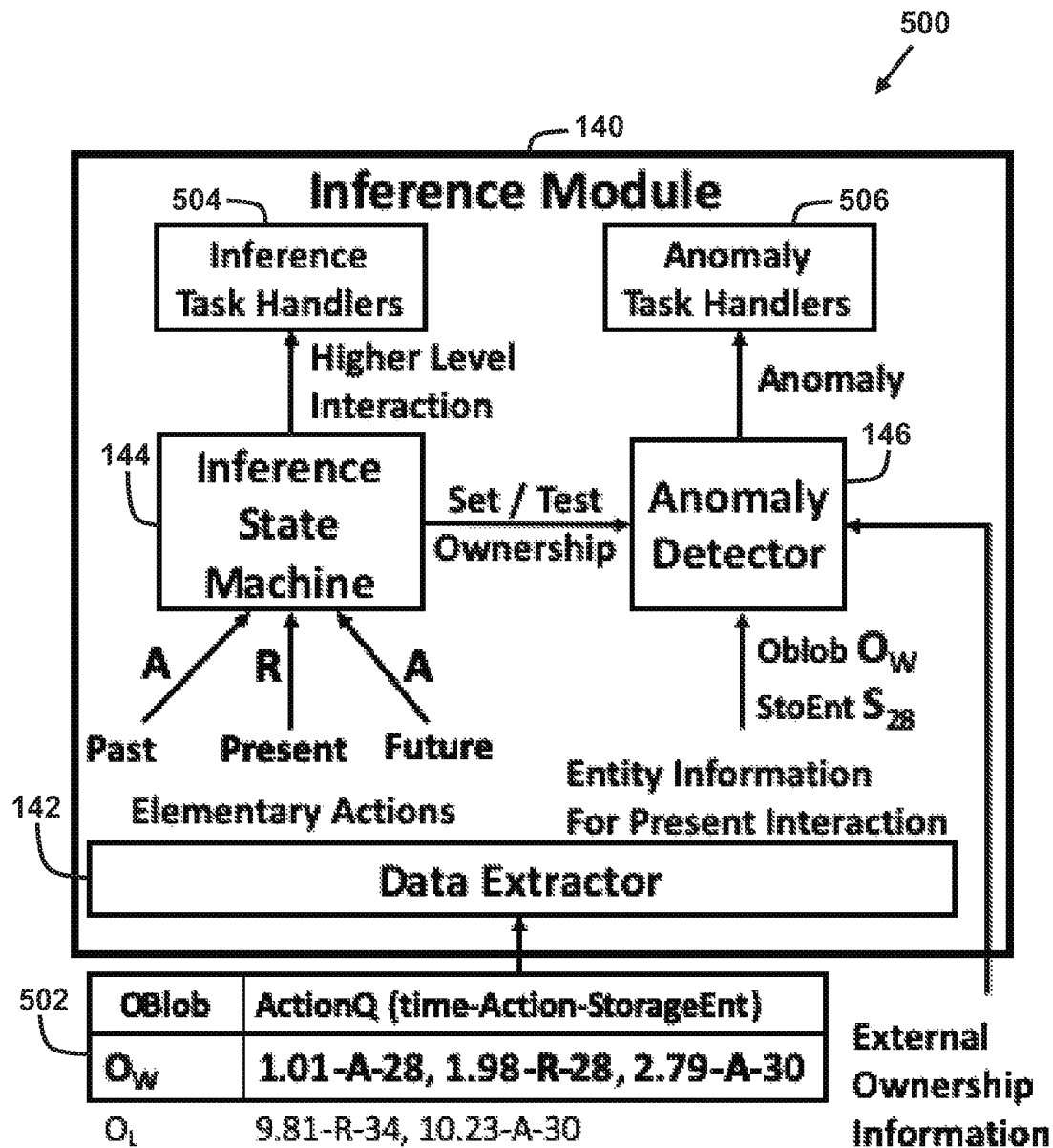
FIG. 13 shows detailed architecture for the inference module of the software architecture of FIG. 7.

FIG. 13 shows detailed architecture 500 for the inference module 140 for handling exemplary inferences with respect to HumEnt instance $H_X$ and OBlob instance $O_W$. Particularly, the at least one processor 42 is configured to execute program instructions of the inference module 140 to make inferences, in particular inferences with respect to higher-level interactions and anomalous interactions, based on the elementary interactions of the HumEnt instance $H_X$ with each of the OBlob instances that the HumEnt instance $H_X$ interacted with. The at least one processor 42 is configured to execute program instructions of the inference module 140 to make inferences in response to a HumanExit event detected at the time of exit $t_{exit}$ of the HumEnt instance $H_X$ and takes the $H_X$.ActionQ as an input. In one embodiment, the at least one processor 42 also takes external ownership information (i.e., ownership information from some other system other than the system 10) as an input for the inference module 140.

Since the particulars of the higher-level interactions and the anomalous interactions vary with the specific application that the architecture 200 is used for, the finite-state machine logic in this module needs to be tweaked according to the application. For this reason, the inference module 140 is designed such that the tweaking according to the application does not involve any changes in the overall architectural framework and so that these changes in the logic are minor and can be easily updated, specific to the requirements of the application.

The higher-level interactions can be thought of as application-specific qualities of the elementary interaction. As used herein, "application-specific quality" refers to an outcome, meaning, or intention than is inferred about an elementary interaction, i.e., an interaction beginning with a HandIn event and ending with a HandOut event, based on additional contextual information. For example, consider an elementary interaction in which a HumEnt instance removes an OBlob instance from a StoEnt instance. Additional contextual information can be used to infer an outcome, meaning, or intention of the elementary interaction. The contextual information may include, for example, previous/future elementary interactions having entities in common with the present interaction or ownership information of one of the entities involved with the present interaction. Based on the contextual information, an elementary removal of an object can be interpreted, for example, as a higher-level interaction of removing an owned object from an owned storage entity, removing an object owned by another person, moving an object from one storage entity to another, or removing merchandise with the intent to purchase the merchandise. As can be seen, the elementary interaction of removing an object is supplemented with additional useful information (i.e., application-specific qualities) that depends on the particular application.

As used herein, "anomalous interaction" refers a higher-level interaction that violates a, generally application-specific, rule or requires some require some ameliorative action. In other words, anomalous interaction is an elementary interaction that is inferred to violate a rule or require some ameliorative action, based on the inferred application-specific quality or other additional contextual information. As discussed above, an elementary removal of an object can be interpreted, for example, as a higher-level interaction of removing an object owned by another person. Based on a rule against removing objects owned by other people, this elementary removal of an object can be flagged as an anomalous interaction, and an alarm can be raised.

With continued reference to FIG. 13, as mentioned above, the inference module 140 includes a data extractor submodule 142. The at least one processor 42 is configured to execute program instructions of the data extractor submodule 142 to extract the interaction history from $H_X$.ActionQ of the exiting HumEnt instance $H_X$ for each OBlob that the HumEnt instance $H_X$ has interacted with. For each particular OBlob instance that the HumEnt instance $H_X$ has interacted with, the at least one processor 42 iterates over all the interaction information for the particular OBlob in the temporal sequence of occurrence, in each iteration fetching at least three consecutive interaction entries, which, for the purpose of the explanation here, are referred to as the PAST, PRESENT and FUTURE. The at least one processor 42 sends the elementary interactions (i.e., an A or R) for each of these entries, PAST, PRESENT and FUTURE, to the inference state machine submodule 144 and sends information pertaining to the StoEnt and OBlob involved in the PRESENT interaction is sent to the anomaly detector submodule 146. This is repeated for every interaction that the exiting HumEnt instance $H_X$ was involved in.

In the illustration of FIG. 12, the data extractor submodule 142 receives at least three consecutive entries 502 from $H_X$.ActionQ for the OBlob instance $O_W$. As discussed above, the entries take the form of tuples [t, A, Y] or [t, R, Y], where t is the time of the interaction, A indicates that the OBlob instance $O_W$ was added, R indicates that the OBlob instance $O_W$ was removed and Y is the ID of the StoEnt instance that was interacted with. Accordingly, in the illustrated example, the OBlob instance $O_W$ was added to the StoEnt instance $S_{28}$ at time t=1.01 (PAST), then removed from the StoEnt instance $S_{28}$ at time t=1.98 (PRESENT), and then added to the StoEnt instance $S_{30}$ at time t=2.79 (FUTURE). The elementary interactions A, R, and A are passed to the inference state machine submodule 144 and the entity information $O_W$ and $S_{28}$ are sent to the anomaly detector submodule 146.

As mentioned above, the inference module 140 includes an inference state machine submodule 144. The at least one processor 42 is configured to execute program instructions of the inference state machine submodule 144 to implement the finite-state machine based logic to infer the higher-level interactions and the ownership relationships between the HumEnt, OBlob and the StoEnt instances. More specifically, the at least one processor 42 processes the causal relationship between the at least three elementary actions in PAST, PRESENT and FUTURE entries to understand higher-level interactions based on a set of rules of interaction specific to the application. Exemplary sets of rules for an airport security checkpoint and for a smart retail store are discussed below. However, it will be appreciated that the particular logic used will vary depending on the application.

In some cases, the higher-level interaction implicitly alters or defines the ownership relationship between the HumEnt instance $H_X$ and the OBlob instance $O_W$ or the StoEnt instance $S_{28}$. In some applications, the first interaction with a particular OBlob instance defines the ownership relationship between the OBlob instance or StoEnt instance and the HumEnt instance who first interacted with it. However, these rules can be customized specific to the application. In response to detecting a higher-level interaction that alters or defines the ownership relationship, the at least one processor 42 is configured to send a Set_Ownership control signal to the anomaly detector submodule 146.

In other cases, the higher-level interaction does not alter or define the ownership relationship between the HumEnt instance $H_X$ and the OBlob instance $O_W$ or the StoEnt instance $S_{28}$. In some applications, the any interaction subsequent a first interaction with a particular OBlob instance or StoEnt instance does not alter or define the ownership relationship for the OBlob instance or StoEnt instance. In response to detecting a higher-level interaction that does not alter or define the ownership relationship, the at least one processor 42 is configured to send a Test_Ownership control signal to the anomaly detector submodule 146.

As mentioned above, the inference module 140 includes an anomaly detector submodule 146. The at least one processor 42 is configured to execute program instructions of the anomaly detector submodule 146 to detect anomalous interactions based on ownership relationships and raise appropriate alarms when anomalies are detected. The at least one processor 42 is configured to execute program instructions of the anomaly detector submodule 146 in parallel with those of the inference state machine submodule 144, which dictate its mode of operation by sending the Set_Ownership and Test_Ownership control signals.

In response to receiving a Set_Ownership control signal, the at least one processor 42 is configured to execute program instructions of the anomaly detector submodule 146 to set the ownership information and remember it for detecting anomalies in successive interactions. Particularly, the at least one processor 42 appends and/or writes information regarding the OBlob instance $O_Z$ to the Owns list in the data attribute $H_X$.OwnershipLog and appends and/or writes information regarding the HumEnt instance $H_X$ to the Owned by list in the data attribute $O_Z$.OwnershipLog. Similarly, the at least one processor 42 may append and/or write information regarding the StoEnt instance $S_Z$ to the Owns list in the data attribute $H_X$.OwnershipLog and append and/or write information regarding the HumEnt instance $H_X$ to the Owned by list in the data attribute $S_Z$.OwnershipLog.

In response to receiving a Test_Ownership control signal, the at least one processor 42 is configured to execute program instructions of the anomaly detector submodule 146 to test if the entities involved in the present interaction ($O_W$ and $S_{28}$ in the illustrated example) belongs to the exiting HumEnt instance $H_X$.

Particularly, the at least one processor 42 tests the ownership of each of the OBlob and StoEnt entities involved in the present interaction by checking if it exists in $H_X$.OwnershipLog. If it does not exist in $H_X$.OwnershipLog, then $H_X$ is not the owner. If the exiting HumEnt instance $H_X$ is not the owner of the entity, then the at least one processor 42 issues an appropriate alarm or warning message. In one embodiment, the at least one processor 42 fetches the actual owner with a gptwc( ) function call using Inter_comm with mode=0.

In at least some embodiments, the inference modules 140 includes inference task handlers 504 and anomaly task handlers 506 for handling application-specific tasks based on inferences of the higher-level interactions and anomalous interactions. Particularly, in response to each particular higher-level interaction and anomalous interaction, the at least one processor 42 executes program instructions of a corresponding inference task handler 504 or anomaly task handler 506 to perform appropriate actions, depending on requirements of the particular application.

Exemplary Higher-Level Interaction and Anomaly Detection Logic

Exemplary logic for inferring higher-level interactions and anomalous interactions is discussed below for the particular exemplary applications described above with respect to FIG. 2 and FIG. 3. However, it will be appreciated that the logic discussed below is merely exemplary and will depend greatly on the particular application of the system 10.

FIG. 14 shows a table 600 summarizing inference logic for detecting higher-level interactions and anomalous interactions in the airport security checkpoint application, discussed above with respect of FIG. 2. The table 600 shows, for each higher-level interaction, the particular combination of elementary actions PAST, PRESENT and FUTURE which cause the inference state machine 144 to infer each respective higher-level interaction, including divesting an owned object and several variants of leaving objects, moving objects, and collecting objects. In the table 600, A means that the logic requires an "add" elementary action, R means that the logic requires a "remove" elementary action, $\phi$ means the logic requires that there is no elementary action, and DNC means that the logic does not care what the elementary action is. For example, if there is no PAST elementary action and the PRESENT elementary action is an "add" elementary action, then the inference state machine 144 infers that the HumEnt instance $H_X$ divested his or her own object.

The table 600 shows, for each higher-level interaction, a particular application-specific task/operation, if any, that is triggered in response to detecting a particular higher-level interaction. For example, an alarm is triggered in response to a human entity taking another's object. Additionally, the table 600 shows, for each higher-level interaction, whether a Set_Ownership control signal of a Test_Ownership control signal is sent to the anomaly detector submodule 146, in response to detecting a particular higher-level interaction. For example, if the inference state machine 144 infers that the HumEnt instance $H_X$ collected an object from a bin, a Test_Ownership control signal is sent to the anomaly detector submodule 146.

Finally, the table 600 shows, for each higher-level interaction, the particular ownership statuses of the OBlob and StoEnt instances involved in the action that are required to infer that the higher-level interaction was an anomalous interaction and indicates what application-specific task/operation is performed in response to the inference. For example, if the inference state machine 144 infers that the HumEnt instance $H_X$ collected an object from a bin and a Test_Ownership control signal is received, the anomaly detector submodule 146 checks whether both the object and bin were owned by the HumEnt instance $H_X$, and raises an alarm if both the object and bin were not owned by the HumEnt instance $H_X$.

FIG. 15 shows a table 700 summarizing inference logic for detecting higher-level interactions and anomalous interactions in the other exemplary application of FIG. 3. The features of the table 700 are essentially similar to those of the table 600 and not described again. Notably, in the smart retail store application, ownership is only established when a HumEnt instance pays and exits the store. Thus, the higher-level interactions such as, "Pick-up," "Pick-up previously misplaced item," "returned to correct shelf," and "Misplaced item in wrong shelf" depend only on the PRESENT interaction. Accordingly, the inference module logic has DNC terms in the PAST and FUTURE elementary actions. So, as long as the HumEnt instance is within the store, the StoEnt instances own the OBlob instances and this is the only ownership relationship that is tested by the anomaly detector submodule 146. The ownership information may be externally supplied to the anomaly detector submodule 146, as it is expected the store will have this information.

It can be also be seen how the inference state machine 144 can keep track of how many objects were purchased and automatically bill the customer for each product. Further, the inference state machine 144 can identify when a product is misplaced and notify, via an alarm/warning, support staff based on the StoEnt ownership information. Additionally, the inference state machine 144 keeps track of how many times a particular type of product was inspected and returned and how many times a product was actually purchased, and this data can be used by businesses to optimize their operations and build a more efficient inventory management system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for tracking person-object interactions in an environment, the method comprising:
receiving, with at least one processor, (i) event data with respect to a plurality of person entities and a plurality of storage entities in the environment and (ii) storage content data with respect to the storage entities, the event data identifying times at which particular person entities in the plurality of person entities moved any extremity into particular storage entities in the plurality of storage entities, the event data identifying times at which particular person entities in the plurality of person entities removed any extremity from particular storage entities in the plurality of storage entities, the storage content data including a plurality of lists identifying object entities in a plurality of object entities that are located within particular storage entities in the plurality of storage entities at different times;
determining, with the at least one processor, based on the event data and the storage content data, a first object entity of the plurality of object entities that was at least one of (i) added to a first storage entity in the plurality of storage entities and (ii) removed from the first storage entity, as a result of a first interaction in which a first person entity in the plurality of person entities moved any extremity into the first storage entity and subsequently removed any extremity from the first storage entity;

determining, with the at least one processor, an application-specific quality of the first interaction based on (i) whether the first object entity was added or removed during the first interaction and (ii) whether the first object entity was added or removed during a second interaction that is previous in time to the first interaction or subsequent in time to the first interaction;

storing, in a memory, in at least one ownership log, an identification of which person entity in the plurality of person entities owns each storage entity in the plurality of storage entities;

determining, with the at least one processor, whether the first interaction was anomalous based on the application-specific quality of the first interaction and which person entity in the plurality of person entities owns the first storage entity into which the first object entity was added or from which the first object entity was removed; and outputting, with an output device, a warning in response to determining that the first interaction was anomalous.

2. The method according to claim 1 further comprising:
assigning, with the at least one processor, a different respective process or thread (i) to each respective person entity in the plurality of person entities, (ii) to each respective storage entity in the plurality of storage entities, and (iii) to each respective object entity in the plurality of object entities,
wherein each different respective process or thread is executed on the at least one processor.

3. The method according to claim 2 further comprising:
communicating, with the at least one processor, between each different respective process or thread assigned to the plurality of person entities, the plurality of storage entities, and the plurality of object entities, using either a message passing interface or an inter-thread communication framework.

4. The method according to claim 1, the receiving the event data and the storage content data further comprising:
receiving the event data and the storage content data from at least one tracker device, the tracker device being configured to determine the event data and the storage content data by monitoring the environment with at least one sensor.

5. The method according to claim 1, the receiving the event data and the storage content data further comprising:
encoding and writing, in a temporally sequenced manner, the event data and the storage content data to at least one file stored on the memory.

6. The method according to claim 1 further comprising:
storing, with the at least one processor, in a first buffer on the memory, in response to each respective time the first person entity moved any extremity into the first storage entity in the plurality of storage entities, a first list identifying object entities in the plurality of object entities that were located within the first storage entity before the respective time the first person entity moved any extremity into the first storage entity, the first list being assigned a unique key pair identifying the first person entity and the first storage entity; and
storing, with the at least one processor, in a second buffer on the memory, in response to each respective time the first person entity removed any extremity from the first storage entity, a second list identifying object entities in the plurality of object entities that were located within the first storage entity after the respective time the first person entity removed any extremity from the first storage entity, the second list being assigned a unique key pair identifying the first person entity and the first storage entity.

7. The method according to claim 6 further comprising:
detecting, with the at least one processor, the first interaction in which the first person entity moved any extremity into the first storage entity and subsequently removed any extremity from the first storage entity in response to determining that a list of the first lists in the first buffer has a matching unique key pair with a list of the second lists in the second buffer, the matching unique key pair identifying the first storage entity.

8. The method according to claim 7, further comprising storing, in the memory, in the at least one ownership log, an identification of which person entity in the plurality of person entities owns each object entity in the plurality of object entities;
determining, with the at least one processor, whether the first interaction was anomalous based on at least one of (i) which person entity in the plurality of person entities owns each object entity added to or removed from the first storage entity as a result of the first interaction and (ii) which person entity in the plurality of person entities owns the first storage entity; and
outputting, with an output device, a warning in response to determining that the first interaction was anomalous.

9. The method according to claim 1, the determining the first object entity that was at least one of (i) added to the first storage entity and (ii) removed from the first storage entity further comprising:
fetching, from the storage content data, a first list identifying object entities in the plurality of object entities that were located within the first storage entity before the first person entity moved any extremity into the first storage entity;
fetching, from the storage content data, a second list identifying object entities in the plurality of object entities that were located within the first storage entity after the first person entity removed any extremity from the first storage entity; and
determining the first object entity that was at least one of (i) added to the first storage entity and (ii) removed from the first storage entity by comparing the first list with the second list.

10. The method according to claim 1, the determining the first object entity that was at least one of (i) added to the first storage entity and (ii) removed from the first storage entity further comprising:
recording, with the at least one processor, in a first interaction log associated with the first person entity on the memory, the first object entity that was at least one of (i) added to the first storage entity and (ii) removed from the first storage entity.

11. The method according to claim 1 further comprising:
performing, with the at least one processor, at least one operation based on the application-specific quality of the first interaction.

12. The method according to claim 1, wherein the event data identifies times at which particular person entities in the plurality of person entities exited the environment, the method further comprising:
determining, with the at least one processor, based on the event data, that the first person entity exited the environment, wherein the determining the application-specific quality of the first interaction is performed in response to determining that the first person entity exited the environment.

13. The method according to claim 1 further comprising:
storing, in the memory, in the at least one ownership log, an identification of which person entity in the plurality of person entities owns each object entity in the plurality of object entities;
determining, with the at least one processor, whether the first interaction was anomalous based on the application-specific quality of the first interaction and which person entity in the plurality of person entities owns the first object entity added or removed with the first interaction; and
outputting, with an output device, a warning in response to determining that the first interaction was anomalous.

14. The method according to claim 13 further comprising:
modifying the at least one ownership log to set, with the at least one processor, the first person entity as owning the first object entity, in response to the first interaction being a first time interaction with the first object entity.

15. The method according to claim 1 further comprising:
modifying the at least one ownership log to set, with the at least one processor, the first person entity as owning the first storage entity, in response to the first interaction being a first time interaction with the first storage entity.

16. The method according to claim 1 further comprising:
storing, in the memory, in the at least one ownership log, an identification of which storage entity in the plurality of storage entities owns each object entity in the plurality of object entities;
determining, with the at least one processor, whether the first interaction was anomalous based on the application-specific quality of the first interaction and which storage entity in the plurality of storage entities owns the first object entity added or removed with the first interaction; and
outputting, with an output device, a warning in response to determining that the first interaction was anomalous.

17. A processing system for tracking person-object interactions in an environment, the processing system comprising:
at least one memory configured to store (i) program instructions, (ii) event data with respect to a plurality of person entities and a plurality of storage entities in the environment, (iii) storage content data with respect to the storage entities, and (iv) at least one ownership log including an identification of which person entity in the plurality of person entities owns each storage entity in the plurality of storage entities, the event data identifying times at which particular person entities in the plurality of person entities moved any extremity into particular storage entities in the plurality of storage entities, the event data identifying times at which particular person entities in the plurality of person entities removed any extremity from particular storage entities in the plurality of storage entities, the storage content data including a plurality of lists identifying object entities in a plurality of object entities that are located within particular storage entities in the plurality of storage entities at different times; and
at least one processor configured to execute the program instructions to:
receive, and store in the memory, the event data and the storage content data; and
determine, based on the event data and the storage content data, a first object entity of the plurality of object entities that was at least one of (i) added to a first storage entity in the plurality of storage entities and (ii) removed from the first storage entity, as a result of a first interaction in which a first person entity in the plurality of person entities moved any extremity into the first storage entity and subsequently removed any extremity from the first storage entity;
determine an application-specific quality of the first interaction based on (i) whether the first object entity was added or removed during the first interaction and (ii) whether the first object entity was added or removed during a second interaction that is previous in time to the first interaction or subsequent in time to the first interaction;
determine whether the first interaction was anomalous based on the application-specific quality of the first interaction and which person entity in the plurality of person entities owns the first storage entity into which the first object entity was added or from which the first object entity was removed; and
operate an output device to output a warning in response to determining that the first interaction was anomalous.

18. A system for tracking person-object interactions in an environment, the system comprising:
at least one tracker device configured to determine (i) event data with respect to a plurality of person entities and a plurality of storage entities in the environment and (ii) storage content data with respect to the storage entities, by monitoring the environment with at least one sensor, the event data identifying times at which particular person entities in the plurality of person entities moved any extremity into particular storage entities in the plurality of storage entities, the event data identifying times at which particular person entities in the plurality of person entities removed any extremity from particular storage entities in the plurality of storage entities, the storage content data including a plurality of lists identifying object entities in a plurality of object entities that are located within particular storage entities in the plurality of storage entities at different times; and
a processing system having:
at least one memory configured to store (i) program instructions, (ii) the event data, (iii) the storage content data, and (iv) at least one ownership log including an identification of which person entity in the plurality of person entities owns each storage entity in the plurality of storage entities; and
at least one processor configured to execute the program instructions to:
receive, and store in the memory, the event data and the storage content data; and
determine, based on the event data and the storage content data, a first object entity of the plurality of object entities that was at least one of (i) added to a first storage entity in the plurality of storage entities and (ii) removed from the first storage entity, as a result of a first interaction in which a first person entity in the plurality of person entities moved any extremity into the first storage entity and subsequently removed any extremity from the first storage entity;

determine an application-specific quality of the first interaction based on (i) whether the first object entity was added or removed during the first interaction and (ii) whether the first object entity was added or removed during a second interaction that is previous in time to the first interaction or subsequent in time to the first interaction;

determine whether the first interaction was anomalous based on the application-specific quality of the first interaction and which person entity in the plurality of person entities owns the first storage entity into which the first object entity was added or from which the first object entity was removed; and operate an output device to output a warning in response to determining that the first interaction was anomalous.

* * * * *